US012317266B2

(12) United States Patent
Kim et al.

(10) Patent No.: US 12,317,266 B2
(45) Date of Patent: May 27, 2025

(54) UE INDICATION OF UPLINK SCHEDULING PARAMETERS IN WIRELESS COMMUNICATIONS

(71) Applicant: QUALCOMM Incorporated, San Diego, CA (US)

(72) Inventors: Yuchul Kim, San Diego, CA (US); Hwan Joon Kwon, San Diego, CA (US); Jay Kumar Sundararajan, San Diego, CA (US); Seyedkianoush Hosseini, San Diego, CA (US); Yongjun Kwak, San Diego, CA (US); Jing Lei, San Diego, CA (US); Prashanth Haridas Hande, San Diego, CA (US); Yeliz Tokgoz, San Diego, CA (US); Huilin Xu, Temecula, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 17/575,417

(22) Filed: Jan. 13, 2022

(65) Prior Publication Data

US 2022/0232605 A1     Jul. 21, 2022

Related U.S. Application Data

(60) Provisional application No. 63/138,254, filed on Jan. 15, 2021.

(51) Int. Cl.
*H04W 76/28* (2018.01)
*H04W 72/12* (2023.01)
(Continued)

(52) U.S. Cl.
CPC ............ *H04W 72/21* (2023.01); *H04W 72/23* (2023.01); *H04W 72/535* (2023.01); *H04W 76/28* (2018.02)

(58) Field of Classification Search
None
See application file for complete search history.

(56) References Cited

U.S. PATENT DOCUMENTS

| 2022/0159568 | A1* | 5/2022 | Kim | H04W 72/21 |
| 2022/0217636 | A1* | 7/2022 | Shrivastava | H04L 5/0055 |
| 2023/0397283 | A1* | 12/2023 | Ljung | H04W 74/0833 |

FOREIGN PATENT DOCUMENTS

WO     WO-2017011106 A1     1/2017

OTHER PUBLICATIONS

International Search Report and Written Opinion—PCT/US2022/012456—ISA/EPO—Apr. 25, 2022.

(Continued)

*Primary Examiner* — Hong Shao
(74) *Attorney, Agent, or Firm* — Holland & Hart LLP

(57) ABSTRACT

Methods, systems, and devices for wireless communication are described for user equipment (UE) indication of uplink scheduling information to a base station. The uplink scheduling information may provide information on a periodic traffic pattern, such as for periodic extended reality (XR) data flows. The uplink scheduling information may provide uplink assistance information (UAI) to a base station to assist the base station with providing uplink resources that efficiently serve an XR session. The UAI may indicate one or more of a periodicity of uplink traffic, an offset between uplink traffic and a packet arrival, a data size for uplink traffic for each time period associated with the XR session, a request to enable uplink transmission skipping, or any combinations thereof. A base station may provide one or (Continued)

more dynamic grants, configured grants, or proactive grants to a UE based on the uplink scheduling information.

30 Claims, 20 Drawing Sheets

(51) Int. Cl.
  *H04W 72/14* (2009.01)
  *H04W 72/21* (2023.01)
  *H04W 72/23* (2023.01)
  *H04W 72/50* (2023.01)

(56) References Cited

OTHER PUBLICATIONS

NTT DOCOMO INC: "UL Data Transmission Procedures", 3GPP TSG RAN WG1 Meeting 91, 3GPP Draft, R1-1720824, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, pp. 1-12, Nov. 18, 2017 (Nov. 18, 2017), XP051370253, Retrieved from the Internet: URL: http://www.3gpp.org/ftp/tsg%5Fran/WG1%5FRL1/TSGR1%5F91/Docs/ [retrieved on Nov. 18, 2017] paragraph [02.1]-paragraph [02.2].

* cited by examiner

UE INDICATION OF UPLINK SCHEDULING PARAMETERS IN WIRELESS COMMUNICATIONS

CROSS REFERENCE

The present application for patent claims the benefit of U.S. Provisional Patent Application No. 63/138,254 by KIM et al., entitled "UE INDICATION OF UPLINK SCHEDULING PARAMETERS IN WIRELESS COMMUNICATIONS," filed Jan. 15, 2021, assigned to the assignee hereof, and expressly incorporated by reference herein.

TECHNICAL FIELD

The following relates to wireless communication, including UE indication of uplink scheduling parameters in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). These communication devices may support various extended reality (XR) applications, such as augmented reality (AR), mixed reality (MR), and virtual reality (VR). In XR applications, these communication devices may generate and send pose information and other control information to avoid visual conflicts, such as misaligning objects between real and virtual environments, and other visual conflicts. In some cases, transmission of the pose information and other control information by these communication devices may be latency sensitive, where increased latency may result in degraded user experience. It therefore may be desirable to manage communications related to XR applications, among other examples, to provide for reduced latency.

SUMMARY

The described techniques relate to improved methods, systems, devices, and apparatuses that support user equipment (UE) indication of uplink scheduling parameters in wireless communications. Various aspects describe communications between a communication devices, such as a UE and a base station (e.g., an eNodeB (eNB), a next-generation NodeB or a giga-NodeB (either of which may be referred to as a gNB)) in which information transmitted by a UE may have a traffic pattern that is based on periodic extended reality (XR) data flows. In some cases, a UE may provide one or more scheduling parameters to a base station to assist the base station with resource allocation for uplink communications associated with an XR session, or other communications session having a periodic uplink traffic flow. In some cases, a UE may provide uplink assistance information (UAI) to a base station to assist the base station with providing uplink resources that efficiently serve an XR session. In some cases, the UAI may indicate one or more of a periodicity of uplink traffic, an offset between uplink traffic and a packet arrival, a data size for uplink traffic for each time period associated with the XR session, a request to enable uplink transmission skipping, or any combinations thereof.

A method for wireless communication at a user equipment (UE) is described. The method may include transmitting, responsive to an initiation of a traffic session (e.g., an extended reality session) at the UE, uplink scheduling information to a base station, the uplink scheduling information indicating one or more scheduling parameters associated with a pattern of uplink wireless resources for uplink data that is to be transmitted from the UE to the base station during the traffic session and communicating with the base station to transmit or receive data associated with the traffic session based on the uplink scheduling information.

An apparatus for wireless communication at a UE is described. The apparatus may include at least one processor, memory coupled with the at least one processor, and instructions stored in the memory. The instructions may be executable by the at least one processor to cause the apparatus to transmit, responsive to an initiation of a traffic session at the UE, uplink scheduling information to a base station, the uplink scheduling information indicating one or more scheduling parameters associated with a pattern of uplink wireless resources for uplink data that is to be transmitted from the UE to the base station during the traffic session and communicate with the base station to transmit or receive data associated with the traffic session based on the uplink scheduling information.

Another apparatus for wireless communication at a UE is described. The apparatus may include means for transmitting, responsive to an initiation of a traffic session at the UE, uplink scheduling information to a base station, the uplink scheduling information indicating one or more scheduling parameters associated with a pattern of uplink wireless resources for uplink data that is to be transmitted from the UE to the base station during the traffic session and means for communicating with the base station to transmit or receive data associated with the traffic session based on the uplink scheduling information.

A non-transitory computer-readable medium storing code for wireless communication at a UE is described. The code may include instructions executable by at least one processor to transmit, responsive to an initiation of a traffic session at the UE, uplink scheduling information to a base station, the uplink scheduling information indicating one or more scheduling parameters associated with a pattern of uplink wireless resources for uplink data that is to be transmitted from the UE to the base station during the traffic session and communicate with the base station to transmit or receive data associated with the traffic session based on the uplink scheduling information.

In some examples of the method, apparatuses, and non-transitory computer-readable medium described herein, the transmitting the uplink scheduling information may include operations, features, means, or instructions for transmitting, to the base station, one or more of a UAI communication that indicates parameters for the pattern of uplink resources or an uplink skipping indication that one or more proactive uplink grants are to be skipped by the UE. In some examples of the method, apparatuses, and non-transitory computer-readable medium described herein, the UAI is associated with an extended reality session and includes one or more of a requested periodicity of uplink traffic, a requested offset of uplink traffic, a requested data size for uplink traffic for each time period associated with the extended reality session, a request to enable uplink transmission skipping, or any combinations thereof. Some examples of the method, apparatuses, and non-transitory computer-readable medium described herein may further include operations, features, means, or instructions for receiving, from the base station, an uplink scheduling pattern that is based on the UAI.

Some examples of the method, apparatuses, and non-transitory computer-readable medium described herein may further include operations, features, means, or instructions for transitioning to a sleep mode between consecutive uplink grants based on the uplink scheduling pattern. In some examples of the method, apparatuses, and non-transitory computer-readable medium described herein, the uplink scheduling pattern provides that uplink communications to the base station and downlink communications from the base station are coordinated to provide additional duration of the sleep mode relative to cases where UAI is unused in deriving the uplink scheduling pattern.

In some examples of the method, apparatuses, and non-transitory computer-readable medium described herein, at least a portion of the uplink scheduling pattern may be received in radio resource control (RRC) signaling. In some examples of the method, apparatuses, and non-transitory computer-readable medium described herein, the uplink scheduling pattern provides one or more of a configured grant for the UE, an enablement of uplink transmission skipping, a sounding reference signal configuration, a channel state information report configuration, a discontinuous reception (DRX) configuration, or any combinations thereof.

In some examples of the method, apparatuses, and non-transitory computer-readable medium described herein, the enablement of uplink transmission skipping indicates that the UE can skip an uplink shared channel communication when the UE does not have uplink data to transmit. Some examples of the method, apparatuses, and non-transitory computer-readable medium described herein may further include operations, features, means, or instructions for receiving, from the base station, one or more proactive grants for one or more uplink communications and where the uplink scheduling information provides an uplink skipping indication that one or more subsequent proactive grants will be unmonitored by the UE. In some examples of the method, apparatuses, and non-transitory computer-readable medium described herein, the uplink skipping indication identifies that the one or more subsequent proactive grants will be unmonitored for a first time period or until a specific time. In some examples of the method, apparatuses, and non-transitory computer-readable medium described herein, the first time period or the specific time correspond to a start of a subsequent downlink burst of the traffic session.

In some examples of the method, apparatuses, and non-transitory computer-readable medium described herein, the uplink skipping indication is an explicit indication provided in a scheduling request that may be transmitted to the base station. In some examples of the method, apparatuses, and non-transitory computer-readable medium described herein, the uplink skipping indication may be provided in a medium access control (MAC) control element (CE) in which a buffer status report (BSR) indication is set to zero. In some examples of the method, apparatuses, and non-transitory computer-readable medium described herein, the uplink skipping indication may be provided by setting an inactivity timer of the UE to a value that initiates a DRX sleep state. In some examples of the method, apparatuses, and non-transitory computer-readable medium described herein, the uplink skipping indication may be provided in a layer-one request that is transmitted in uplink control information to the base station.

A method for wireless communication at a base station is described. The method may include receiving, from a UE responsive to an initiation of a traffic session at the UE, uplink scheduling information that indicates one or more scheduling parameters associated with a pattern of uplink wireless resources for uplink data that is to be transmitted from the UE to the base station during the traffic session and communicating with the UE to receive or transmit data associated with the traffic session based on the uplink scheduling information.

An apparatus for wireless communication at a base station is described. The apparatus may include at least one processor, memory coupled with the at least one processor, and instructions stored in the memory. The instructions may be executable by the at least one processor to cause the apparatus to receive, from a UE responsive to an initiation of a traffic session at the UE, uplink scheduling information that indicates one or more scheduling parameters associated with a pattern of uplink wireless resources for uplink data that is to be transmitted from the UE to the base station during the traffic session and communicate with the UE to receive or transmit data associated with the traffic session based on the uplink scheduling information.

Another apparatus for wireless communication at a base station is described. The apparatus may include means for receiving, from a UE responsive to an initiation of a traffic session at the UE, uplink scheduling information that indicates one or more scheduling parameters associated with a pattern of uplink wireless resources for uplink data that is to be transmitted from the UE to the base station during the traffic session and means for communicating with the UE to receive or transmit data associated with the traffic session based on the uplink scheduling information.

A non-transitory computer-readable medium storing code for wireless communication at a base station is described. The code may include instructions executable by at least one processor to receive, from a UE responsive to an initiation of a traffic session at the UE, uplink scheduling information that indicates one or more scheduling parameters associated with a pattern of uplink wireless resources for uplink data that is to be transmitted from the UE to the base station during the traffic session and communicate with the UE to receive or transmit data associated with the traffic session based on the uplink scheduling information.

In some examples of the method, apparatuses, and non-transitory computer-readable medium described herein, the uplink scheduling information includes one or more of a UAI communication that indicates parameters for the pattern of uplink resources or an uplink skipping indication that one or more proactive uplink grants are to be skipped by the UE. In some examples of the method, apparatuses, and non-transitory computer-readable medium described herein, the UAI is associated with an extended reality session and includes one or more of a requested periodicity of uplink traffic, a requested offset of uplink traffic, a requested data size for uplink traffic for each time period associated with the extended reality session, a request to enable uplink transmission skipping, or any combinations thereof. In some examples of the method, apparatuses, and non-transitory computer-readable medium described herein, the UAI includes one or more of a requested periodicity of uplink grants, a requested offset of uplink grants, a requested data size for each time period associated with the extended reality session, a request to enable uplink transmission skipping, or any combinations thereof.

Some examples of the method, apparatuses, and non-transitory computer-readable medium described herein may further include operations, features, means, or instructions for transmitting, to the UE, an uplink scheduling pattern that is based on the UAI. In some examples of the method, apparatuses, and non-transitory computer-readable medium described herein, the uplink scheduling pattern provides that uplink communications from the UE and downlink communications to the UE are coordinated to provide additional duration of a sleep mode at the UE relative to cases where UAI is unused in deriving the uplink scheduling pattern. In some examples of the method, apparatuses, and non-transitory computer-readable medium described herein, at least a portion of the uplink scheduling pattern may be transmitted to the UE in RRC signaling. In some examples of the method, apparatuses, and non-transitory computer-readable medium described herein, the uplink scheduling pattern provides one or more of a configured grant for the UE, an enablement of uplink transmission skipping, a sounding reference signal configuration, a channel state information report configuration, a DRX configuration, or any combinations thereof.

In some examples of the method, apparatuses, and non-transitory computer-readable medium described herein, the enablement of uplink transmission skipping indicates that the UE can skip an uplink shared channel communication when the UE does not have uplink data to transmit. Some examples of the method, apparatuses, and non-transitory computer-readable medium described herein may further include operations, features, means, or instructions for transmitting, to the UE, one or more proactive grants for one or more uplink communications associated with the traffic session, and where the uplink scheduling information provides an uplink skipping indication that one or more subsequent proactive grants will be unmonitored by the UE and discontinuing transmitting the one or more proactive grants to the UE responsive to the uplink skipping indication.

In some examples of the method, apparatuses, and non-transitory computer-readable medium described herein, the uplink skipping indication identifies that the one or more subsequent proactive grants will be unmonitored for a first time period or until a specific time, and where the transmitting of the one or more proactive grants are discontinued for the first time period or until the specific time. In some examples of the method, apparatuses, and non-transitory computer-readable medium described herein, the first time period or the specific time correspond to a start of a subsequent downlink burst of the traffic session.

In some examples of the method, apparatuses, and non-transitory computer-readable medium described herein, the uplink skipping indication may be an explicit indication provided in a scheduling request that is received from the UE. In some examples of the method, apparatuses, and non-transitory computer-readable medium described herein, the uplink skipping indication may be provided in a medium access control (MAC) control element (CE) in which a BSR indication is set to zero. In some examples of the method, apparatuses, and non-transitory computer-readable medium described herein, the uplink skipping indication may be provided by setting an inactivity timer of the UE to a value that initiates a DRX sleep state. In some examples of the method, apparatuses, and non-transitory computer-readable medium described herein, the uplink skipping indication may be provided as a layer-one request that is transmitted in uplink control information from the UE.

DETAILED DESCRIPTION

Figure 1:
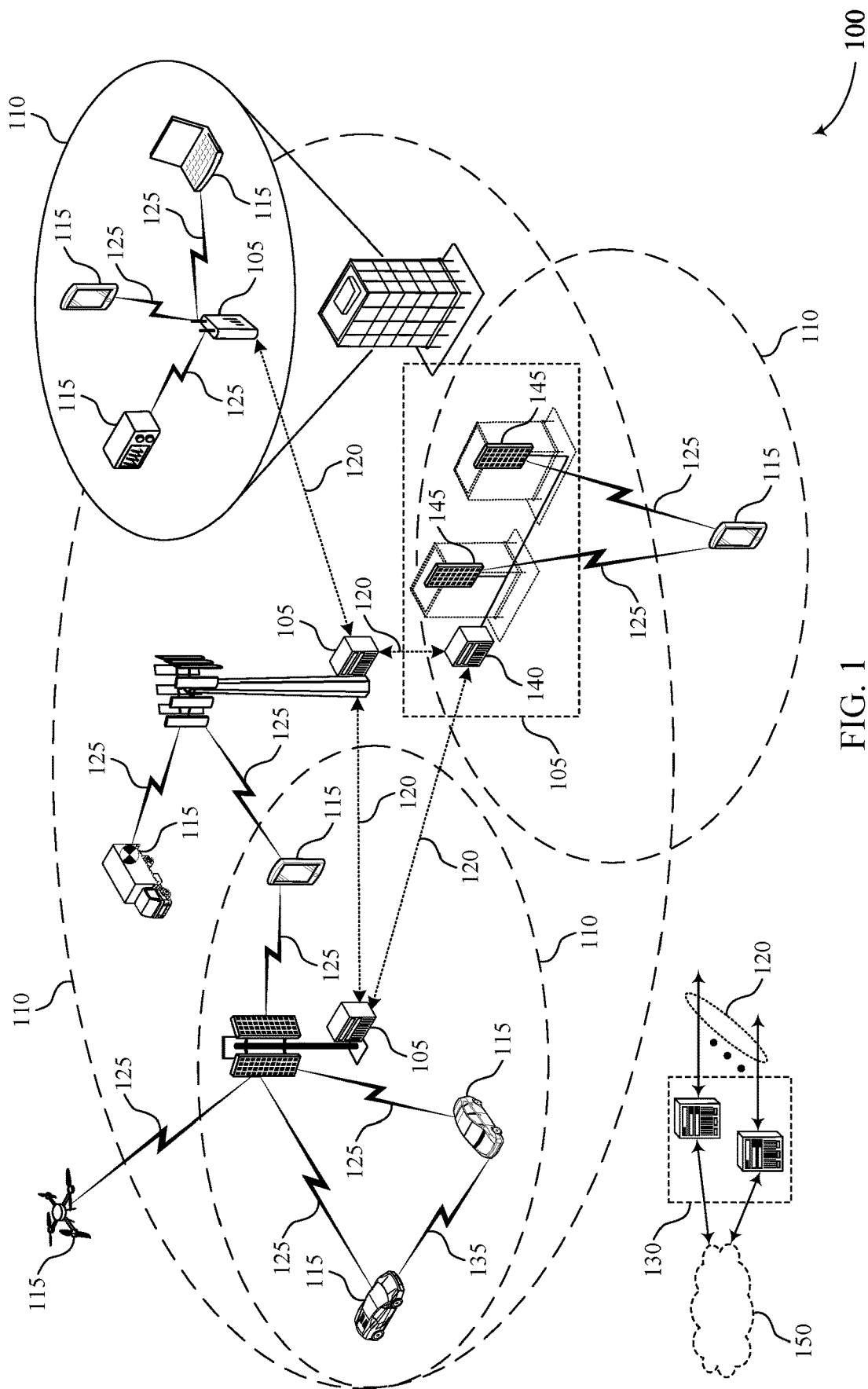
FIGS. 1 and 2 illustrate examples of wireless communications systems that support UE indication of uplink scheduling parameters in wireless communications in accordance with aspects of the present disclosure.

Some wireless communication systems may include communication devices, such as UEs and base stations (e.g., eNBs, next-generation NodeBs or giga-NodeBs (either of which may be referred to as a gNB)) that may support multiple radio access technologies. Examples of radio access technologies include 4G systems such as LTE systems and 5G systems which may be referred to as NR systems. Communication devices in such systems may support various extended reality (XR) applications, such as augmented reality (AR), mixed reality (MR), and virtual reality (VR). Various types of XR applications may have periodic or semi-periodic data traffic, such as periodic traffic that is associated with pose information. The applications may be hosted by a server as described herein. The server may transmit the periodic or semi-periodic downlink data traffic to a base station, which may forward the downlink data traffic to the UE, and the UE may transmit the periodic or semi-periodic uplink data traffic to a base station, which may forward the uplink data traffic to the server.

In XR applications, features from the real and virtual environments may be overlaid and displayed to a user for consumption via the UE. To avoid visual conflicts, such as misaligning objects from the real and virtual environments, and other visual conflicts, the UE may sense, generate, and send pose information to a network (e.g., a base station, a server hosting the XR application). The pose information may define a position and orientation of the UE (or user) in space relative to the real and virtual environments. The UE may send the pose information and/or other control information according to a periodicity that is associated with a frame rate of an XR application. In some cases, the UE may be provided with a configured grant that may allocate periodic resources (also referred to as configured grant resources), which the UE may use for downlink reception or uplink transmission, or both. Configured grants may be provided, in some cases, in radio resource control (RRC) signaling. In other cases, the base station may provide dynamic grants to the UE, which may be based on a scheduling request (SR), a buffer status report (BSR), or combinations thereof, that may be transmitted by the UE. In further cases, the base station may provide proactive grants (PGs) to the UE based on expected uplink data to be transmitted by the UE, and PGs may be dynamically indicated by the base station without an SR indication.

In order to provide sufficient uplink resources the base station may need to be aware of one or more parameters associated with XR traffic of the UE. In accordance with various aspects as discussed herein, a UE may provide one or more scheduling parameters to a base station to assist the base station with resource allocation for uplink communications associated with an XR session. In various traditional wireless communications systems, a UE may be unable to explicitly provide such uplink scheduling parameters, and such systems instead provide for indication of a buffer status at the UE through a BSR, SR, or a quality of service (QoS) indication associated with different communications types, or combinations thereof. However, such techniques may not provide a base station with an indication of a traffic pattern at the UE, which may be helpful in timing and data quantities for resource allocations for uplink communications from the UE. In some aspects, the present disclosure provides that a UE may indicate a preferred uplink resource allocation to a base station, which may allow for uplink grants from the base station that more closely match expected uplink data (e.g., uplink data that provides a user pose or uplink scene).

In some cases, a UE may provide uplink assistance information (UAI) to a base station to assist the base station with providing uplink resources that efficiently serve an XR session. In some cases, the UAI may indicate one or more of a periodicity of uplink traffic, an offset of uplink traffic (e.g., an amount of time between a reference subframe (such as subframe 0 or system frame number 0 (SFN #0)) and a packet arrival, a data size for uplink traffic for each time period associated with the XR session, a request to enable uplink transmission skipping, or any combinations thereof. Providing such additional information may assist the base station in allocating an appropriate amount of radio resources for uplink transmission. Further, such additional information may shape the transmission pattern so that the UE may reduce its power consumption (e.g., through alignment of uplink and downlink communications that allow for the UE to transition to a sleep mode for a longer duration than for unaligned uplink and downlink communications). Further, such UAI may be helpful to the base station by allowing the network to manage radio resources efficiently in serving multiple UEs. Additionally or alternatively, the UE may provide an indication that one or more uplink communications (e.g., physical uplink shared channel (PUSCH transmissions)) are to be skipped, which may allow the base station to discontinue transmission of one or more downlink control channel transmissions (e.g., physical downlink control channel (PDCCH) transmissions) and thereby help reduce overhead in the wireless communications system.

Aspects of the subject matter described in this disclosure may be implemented to realize one or more of the following potential improvements, among others. The techniques employed by the UE may provide benefits and enhancements to the operation of the UE, base station, one or more other network components, or any combinations thereof. For example, operations performed by the UE may provide power saving improvements to the UE (e.g., through increased durations of sleep periods). In some examples, UE indication of UAI may allow for more accurate scheduling of uplink resources at the UE, which may promote higher reliability and lower latency for XR-related operations, and enhanced user experience, among other benefits. Further, UE indication of PUSCH skipping may allow a base station to discontinue associated PDCCH transmissions, and thereby allow associated resources to be allocated for other communications, allowing for enhancements in network resource usage which may further promote higher reliability, lower latency, and enhance overall network capacity.

Aspects of the disclosure are initially described in the context of wireless communications systems. Additional aspects of the disclosure are described in the context of an example communications configuration, example resource allocation schemes, and an example process flow. Aspects of the disclosure are further illustrated by and described with reference to apparatus diagrams, system diagrams, and flowcharts that relate to UE indication of uplink scheduling parameters in wireless communications.

FIG. 1 illustrates an example of a wireless communications system 100 that supports UE indication of uplink scheduling parameters in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, or the like, which may be implemented in various articles such as appliances, drones, robots, vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

The base station 105 and the UE 115 may support various types of applications that may have periodic or semi-periodic data traffic. The base station 105 may be in wireless communication with a server (e.g., a server that is included in or connected with the wireless communications system 100), which may provide the periodic or semi-periodic data traffic to the base station 105 to forward to the UE 115. Likewise, the UE 115 may provide the periodic or semi-periodic data traffic to the base station 105 to forward to the server. The server may be a cloud server, a server associated with an application subscription provider, proxy server, web server, application server, or any combination thereof. The server may include an application distribution platform. The application distribution platform may allow the UE 115 to discover, browse, share, and download applications via the base station 105, and therefore provide a digital distribution of the application from the application distribution platform. As such, a digital distribution may be a form of delivering content such as data, without the use of physical media but over online delivery mediums, such as the Internet. For example, the UE 115 may upload or download applications for streaming, downloading, uploading, or processing, data (e.g., images, audio, video). The server may also transmit to the UE 115 a variety of information, such as instructions or commands to download applications on the UE 115 via the base station 105.

By way of example, the base station 105 and the UE 115 may support XR applications, which may have periodic or semi-periodic XR data traffic. An XR application may support various frame rates, for example 60 MHz frame rates or 120 MHz frame rates. The server and UE 115 may generate an XR frame at 60 MHz, which may correspond to a periodicity of 16.67 ms. Alternatively, the server and UE 115 may generate an XR frame at 120 MHz, which may correspond to a periodicity of 8.33 ms. The server may transmit the periodic or semi-periodic XR data traffic to the base station 105, which may forward the XR data traffic to the UE 115, and likewise the UE 115 may transmit the periodic or semi-periodic XR data traffic to the base station 105, which may forward the XR data traffic to the server. The XR data traffic may be divided into multiple slices (also referred to as files) and each slice encoded and transmitted separately to the base station 105, which may forward the XR data traffic using multiple TBs (also referred to as a burst of TBs).

For XR applications features from the real and virtual environments may be overlaid and displayed to a user for consumption via the UE 115. To avoid visual conflicts, such as misaligning objects from the real and virtual environments, among other visual conflicts, the UE 115 may generate and send pose information to a network (e.g., a server hosting the XR application). The pose information may define a position and orientation of the UE 115 (or user) in space relative to the real and virtual environments. In some cases, different applications may have different uplink data flows.

For VR applications there may be a single uplink data flow. For example, the UE 115 may generate pose information (e.g., six degree of freedom (6DOF) pose information) and other control information. In some examples, the UE 115 may generate or transmit the pose information based on a data rate (e.g., 0.5-2 Mbps). The UE 115 may transmit the pose information and other control information based on an uplink transmit periodicity (e.g., 2 mn (500 Hz)). In some examples, the pose information and other control information may have different file sizes (e.g., 0.5 Mbit/500=1 Kbit=125 byte, 2 Mbit/500=4 Kbit=500 byte). An FDP may be 1.25 ms to 10 ms.

For AR applications there may be two uplink data flows. As part of the first uplink data flow, the UE 115 may generate pose information (e.g., 6DOF pose information) and other control information. The UE 115 may generate or transmit the pose information based on a data rate (e.g., 0.5-2 Mbps). The UE 115 may transmit the pose information and other control information based on an uplink transmit periodicity (e.g., 2 mn (500 Hz)). Similarly, for the AR applications, the FDP may be 1.25 ms to 10 ms. As part of the second uplink data flow, the UE 115 may generate pose information for a scene update associated with the AR applications. For scene updates, the UE 115 may generate or transmit the pose information based on a data rate (e.g., 10 Mbps at 10 Hz). In some examples, the pose information may have different file sizes (e.g., 1 Mbits per 100 ms=125 kbyte). An FDB may be 100 ms.

The UE 115 may benefit from the periodic or semi-periodic data traffic, and more specifically from the transmission delay between bursts of TBs carrying the periodic or semi-periodic data traffic to implement various operations to reduce power consumption. The UE 115 may send the pose information and/or other control information in accordance with a configured grant, a dynamic grant, or a proactive grant, which, in some cases, may configure the UE 115 with a set of parameters to use when transmitting the pose information and/or other control information to the network. Various aspects of the present disclosure relate to UE 115 transmission of uplink scheduling information, such as UAI or a PUSCH skipping indication, which may allow for efficient uplink resource allocation for the UE 115. Thus, the UE 115 may provide scheduling information based on uplink traffic parameters, which may result in improved reliability and latency for XR applications, and reduced power consumption for the UE 115.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, information transmitted by a UE 115 may have a traffic pattern that is based on periodic XR data flows. In some cases, a UE 115 may provide one or more scheduling parameters to a base station 105 to assist the base station 105 with resource allocation for uplink communications associated with an XR session (or other communications session having a periodic uplink traffic flow). In some cases, a UE 115 may provide UAI to a base station 105 to assist the base station 105 with providing uplink resources that efficiently serve an XR session. In some cases, the UAI may indicate one or more of a periodicity of uplink traffic, an offset between uplink traffic and a packet arrival, a data size for uplink traffic for each time period associated with the XR session, a request to enable uplink transmission skipping, or any combinations thereof.

Figure 2:
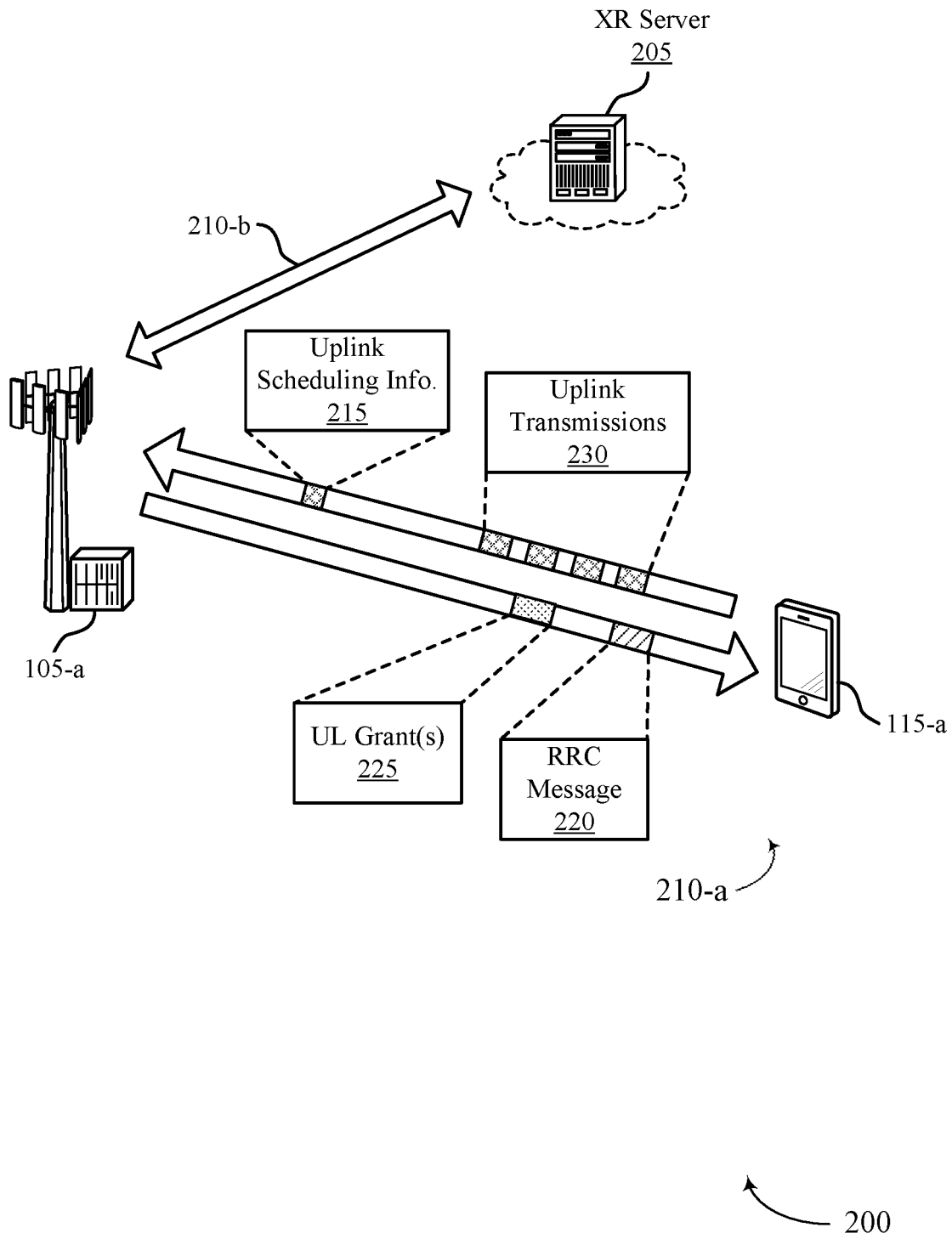

FIG. 2 illustrates an example of a wireless communications system 200 that supports UE indication of uplink scheduling parameters in wireless communications in accordance with aspects of the present disclosure. In some examples, wireless communications system 200 may implement aspects of wireless communications system 100. The wireless communications system 200 may include a UE 115-a, a base station 105-a, which may be examples of UEs 115 and base stations 105, as described with reference to FIG. 1, and an XR server 205.

The UE 115-a may communicate with the base station 105-a using a communication link 210-a. In some cases, the communication link 210-a may include an example of an access link (e.g., a Uu link). The communication link 210-a may include a bi-directional link that can include both uplink and downlink communication. For example, the UE 115-a may transmit uplink transmissions, such as uplink control signals or uplink data signals (e.g., uplink scheduling information 215 and uplink transmissions 230), to the base station 105-a using the communication link 210-a. The base station 105-a may transmit downlink transmissions, such as RRC messages 220, uplink grants 225, other downlink control information (DCI), downlink data signals (e.g., PDSCH transmissions), or combinations thereof, to the UE 115-a using the communication link 210-a.

Similarly, the base station 105-a may communicate with the XR server 205 using a communication link 210-b. Moreover, the UE 115-a may communicate with the XR server 205 through the base station 105-a (e.g., via communication links 210-a and 210-b). For example, the UE 115-a may transmit uplink transmissions 230 to the base station 105-a via the communication link 210-a, where the base station 105-a may relay or forward the uplink transmissions 230 to the XR server 205 for processing. The communication links 210-a and 210-b may include unidirectional communication links and/or bidirectional communications links. In the context of an XR application, the UE 115-a may transmit uplink data associated with the XR application (e.g., pose information, control information, scene information) to the XR server 205 via communication links 210-a and 210-b. The XR server 205 may then encode and render XR frames based on the received information, and may transmit XR frames to the base station 105-a via communication link 210-b. Subsequently, the base station 105-a may transmit downlink data (e.g., XR frames, XR frame bursts) to the UE 115-a via communication link 210-a.

As discussed herein, the UE 115-a may in some cases, transmit uplink scheduling information 215 to the base station 105-a that may allow for efficient allocation of uplink resources. The uplink scheduling information 215 may include, for example, UAI related to an uplink traffic pattern for an XR session, an indication of PUSCH skipping, or any combinations thereof. In some cases, the UAI may indicate one or more of a periodicity of uplink traffic, an offset between uplink traffic and a packet arrival, a data size for uplink traffic for each time period associated with the XR session, a request to enable uplink transmission skipping, or any combinations thereof. Based on the uplink scheduling information, the base station 105-a may allocate uplink resources, which may be indicated to the UE 115-a in RRC message 220 (e.g., for a configured grant), or in DCI that contains one or more uplink grants 225. Based on the resource allocation received from the base station 105-a, the UE 115-a may transmit uplink transmissions 230 in accordance with the allocation uplink resources. Such techniques may allow for efficient wireless resource utilization through efficient allocations of uplink resources and reallocation of wireless resources in the event that the UE 115-*a* indicates PUSCH skipping. Further, such techniques may allow for additional power savings at the UE 115-*a* through alignment of uplink and downlink communications and allowing the UE 115-*a* to enter a sleep mode between communication bursts.

Figure 3A:
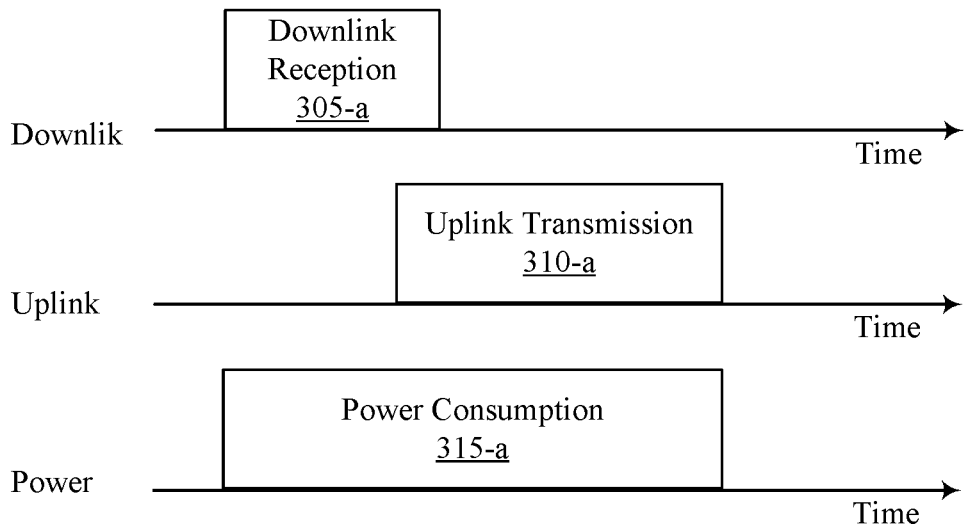
FIGS. 3A and 3B illustrate examples of transmission configurations that support UE indication of uplink scheduling parameters in wireless communications in accordance with aspects of the present disclosure.
Figure 3B:
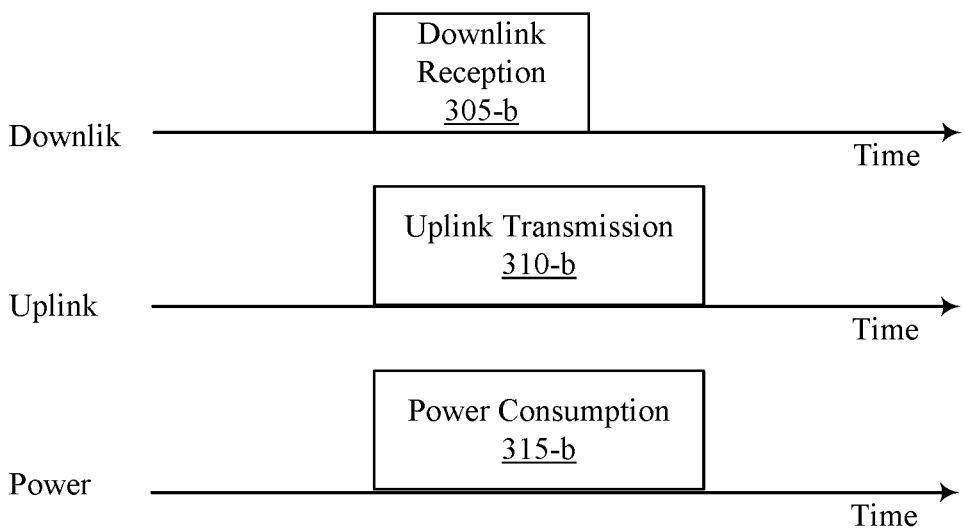

FIGS. 3A and 3B illustrate example of transmission configurations 300 that support UE indication of uplink scheduling parameters in wireless communications in accordance with aspects of the present disclosure. In some examples, transmission configurations 300 may implement aspects of wireless communications systems 100 or 200. For example, the transmission configuration 300-*a* may be based on a configuration by a base station 105 and implemented by a UE 115. In the example of FIG. 3A, the base station may transmit, and the UE may receive, a dynamic grants for downlink receptions 305-*a* and uplink transmissions 310-*a*. For example, the base station may transmit, and the UE may receive, a grant via DCI from the base station.

In some cases, such as illustrated in FIG. 3A, the downlink receptions 305-*a* and the uplink transmissions 310-*a* may not be aligned, and thus the UE awake time is extended which thereby results in a period of increased UE power consumption 315-*a* that is longer than a duration that would be needed if downlink reception 305-*a* and uplink transmission 310-*a* were aligned. In accordance with various aspects of the present disclosure, UE indication of scheduling information to the base station may allow the base station to allocate aligned resources to the UE, such as illustrated in FIG. 3B. In the example of FIG. 3B, the base station in allocation 300-*b* may allocate resources for downlink reception 305-*b* and uplink transmission 310-*b* that are more closely aligned. Such alignment allows for a reduced period of UE power consumption 315-*b*, and may allow the UE to transition to a power-saving or sleep mode between communication bursts.

Figure 4:
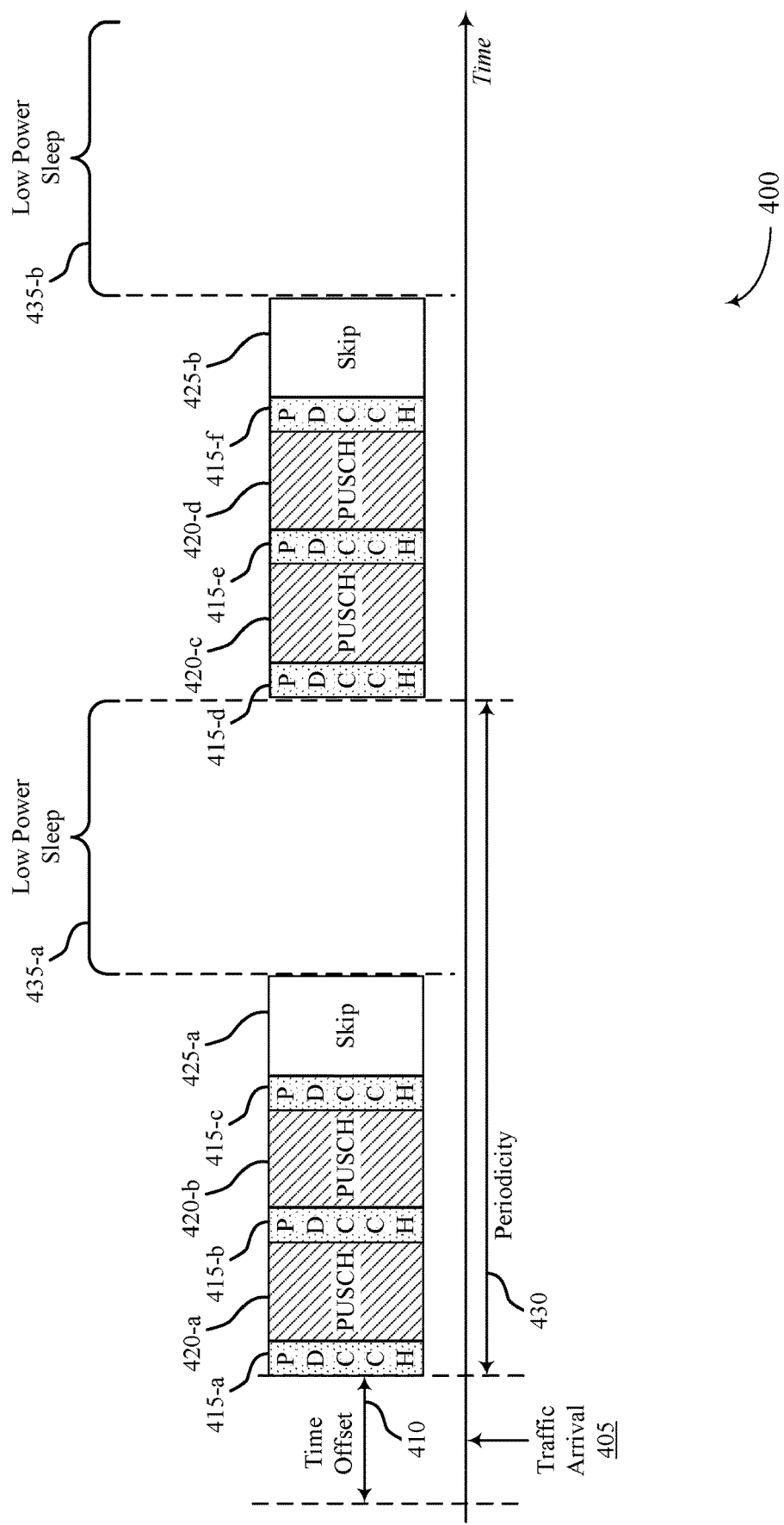
FIGS. 4 and 5 illustrate examples of downlink control channel and uplink shared channel communications that support UE indication of uplink scheduling parameters in wireless communications in accordance with aspects of the present disclosure.

FIG. 4 illustrates an example of a downlink control channel and uplink shared channel communications 400 that supports UE indication of uplink scheduling parameters in wireless communications in accordance with aspects of the present disclosure. In this example, a UE and base station (e.g., a base station 105 and UE 115 as discussed herein) may communicate periodic traffic associated with an XR application.

In this example, an XR data traffic arrival 405 may occur in a time offset 410 between a reference time (e.g., subframe 0 or SFN-0) and an initial PDCCH 415-*a* that starts an uplink burst. The initial PDCCH 415-*a* may provide an uplink grant for a first PUSCH 420-*a*, followed by a second PDCCH 415-*b*, a second PUSCH 420-*b*, and a third PDCCH 415-*c*. In this example, an amount of uplink traffic at the UE may result in the UE not needing the third PUSCH resources, and the UE may skip the third PUSCH as indicated as skip 425-*a*. In this example, the XR data may have a periodicity 430 such that a subsequent burst will start according to the period of periodicity 430. The UE may transition to a low power sleep 435-*a* between bursts, and may transition back to an awake mode for a fourth PDCCH 415-*d*, a fourth PUSCH 420-*c*, a fifth PDCCH 415-*e*, a fifth PUSCH 420-*d*, and a sixth PDCCH 415-*f*. Again, based on an amount of traffic of the XR traffic pattern, the PUSCH associated with the sixth PDCCH 415-*f* may be skipped, as indicated as skip 425-*b*, and the UE may transition again to low power sleep 435-*b*.

In some cases, the UE may identify one or more parameters associated with the XR traffic, which may be provided to the base station to assist with uplink scheduling. In some cases, the UE may transmit UAI that can request and provide additional information to the base station about uplink pose/control information timing, which is favorable for power saving, which the base station can use in uplink scheduling. In some cases, the UAI may include a number of parameters that provide additional information to help uplink scheduling at the base station, such as a preferred periodicity of uplink grants, a preferred time offset of uplink grants, an average data size per period, a request for enabling of PUSCH skipping (e.g., a request that indicates skipUplinkTxDymaic=TRUE). Using such UAI, the base station or other scheduler at the network can configure a scheduling pattern or modify an existing scheduling pattern. Such a scheduling pattern may allow for efficient scheduling of wireless resources based on an expected XR traffic pattern, and may also provide the benefit of additional UE power saving through alignment of downlink and uplink communications.

In some cases, when an XR session starts, the UE can request uplink scheduling by sending the UAI to the serving base station (e.g., in uplink control information (UCI), in RRC signaling (e.g., in an information element for UAI), in a MAC-CE, or any combinations thereof. The base station, upon receipt of the UAI, may optionally configure or modify an uplink scheduling configuration for periodic uplink bursts in accordance with the UAI. The uplink scheduling configuration may include one or more of a configured grant, enablement of PUSCH skipping, sounding reference signal transmission configuration, channel state information (CSI) report configuration, discontinuous reception (DRX) configuration, or any combinations thereof. The timing of uplink scheduling may be determined based on preference parameters carried in UAI. In some cases, if the base station configures skipUplinkTxDymaic set to true in a separate RRC message, then UE can skip PUSCH for a dynamic grant. In some cases, the UE may provide an indication that it will skip one or more PUSCH transmissions, which may allow the base station to discontinue transmitting DCI in some situations, such as discussed with reference to FIG. 5.

Figure 5:
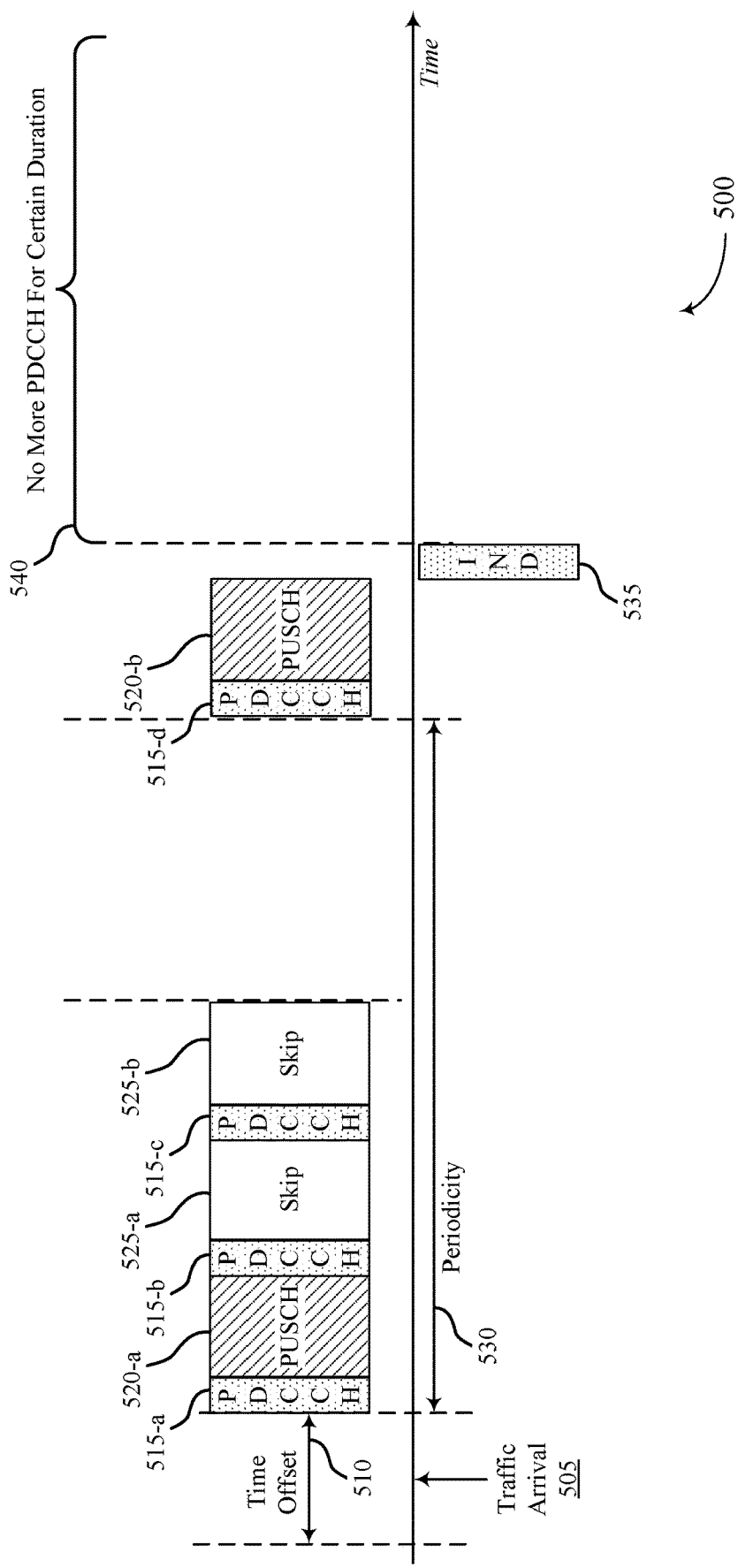

FIG. 5 illustrates an example of a downlink control channel and uplink shared channel 500 that supports UE indication of uplink scheduling parameters in wireless communications in accordance with aspects of the present disclosure. In this example, a UE and base station (e.g., a base station 105 and UE 115 as discussed herein) may communicate periodic traffic associated with an XR application.

In this example, an XR data traffic arrival 505 may occur in a time offset 510 between a reference time (e.g., subframe 0 or SFN-0) and an initial PDCCH 515-*a* that starts an uplink burst, where uplink bursts have periodicity 530. The initial PDCCH 515-*a* may provide an uplink grant for a first PUSCH 520-*a*, followed by a second PDCCH 515-*b* and a third PDCCH 515-*c* that provide subsequent uplink grants. In this example, an amount of uplink traffic at the UE may result in the UE not needing the second and third PUSCH resources, and the UE may skip these PUSCHs as indicated as skip 525-*a* and skip 525-*b*. In such cases, the second PDCCH 515-*b* and the third PDCCH 515-*c* are each wasted, as the allocated resources are unused. In accordance with various aspects of the present disclosure, the UE may transmit an indication 535 that indicates one or more subsequent PUSCHs are to be skipped. In the example of FIG. 5, a fourth PDCCH 515-*d* may provide an allocation for a second PUSCH 520-*b*, and subsequent to the second PUSCH 520-*b* (e.g., in UCI that is provided with or separate from the PUSCH), the UE may provide the indication 535 that indicates PUSCH skipping. Based on the indication 535, the base station may discontinue PDCCH transmissions, such that no more PDCCH are provided to the UE for a certain duration, as indicated at 540.

Such techniques may allow the base station to reduce PDCCH overhead, and reallocate such resources for other communications. In some cases, the PDCCHs 515 may be proactive grants, that are transmitted through regular DCI. If the UE skips the indicated uplink transmissions, the base station may stop sending uplink grants based on the indication 535, which may provide an explicit indication of PUSCH skipping. In the absence of the explicit indication 535, it may be ambiguous at the base station as to whether the PUSCH was skipped or whether there was a decoding error. In some cases, the time period for discontinuing PDCCH transmissions and sending additional uplink grants may be for a predetermined time period, for a time period provided with system information (e.g., in RRC signaling or a remaining minimum system information (RMSI) communication), or until a specific time (e.g., start of next XR traffic burst). In some cases, the indication 535 may be provided in a SR, such as in a multi-bit SR in which one SR state may be assigned for this purpose. In other cases, the indication 535 may be provided in a MAC-CE with BSR=0. In other cases, the indication 535 may be provided in UCI (e.g., a layer-1 (L1) communication) or MAC-CE that sets an inactivity timer to zero and thus triggers the UE to enter a DRX OFF state with no further PDCCH. In other cases, the indication 525 may be provided in a UCI (e.g., L1) request to skip PDCCH monitoring, that may indicate that the UE may be still in an active state but with no PDCCH monitoring.

Figure 6:
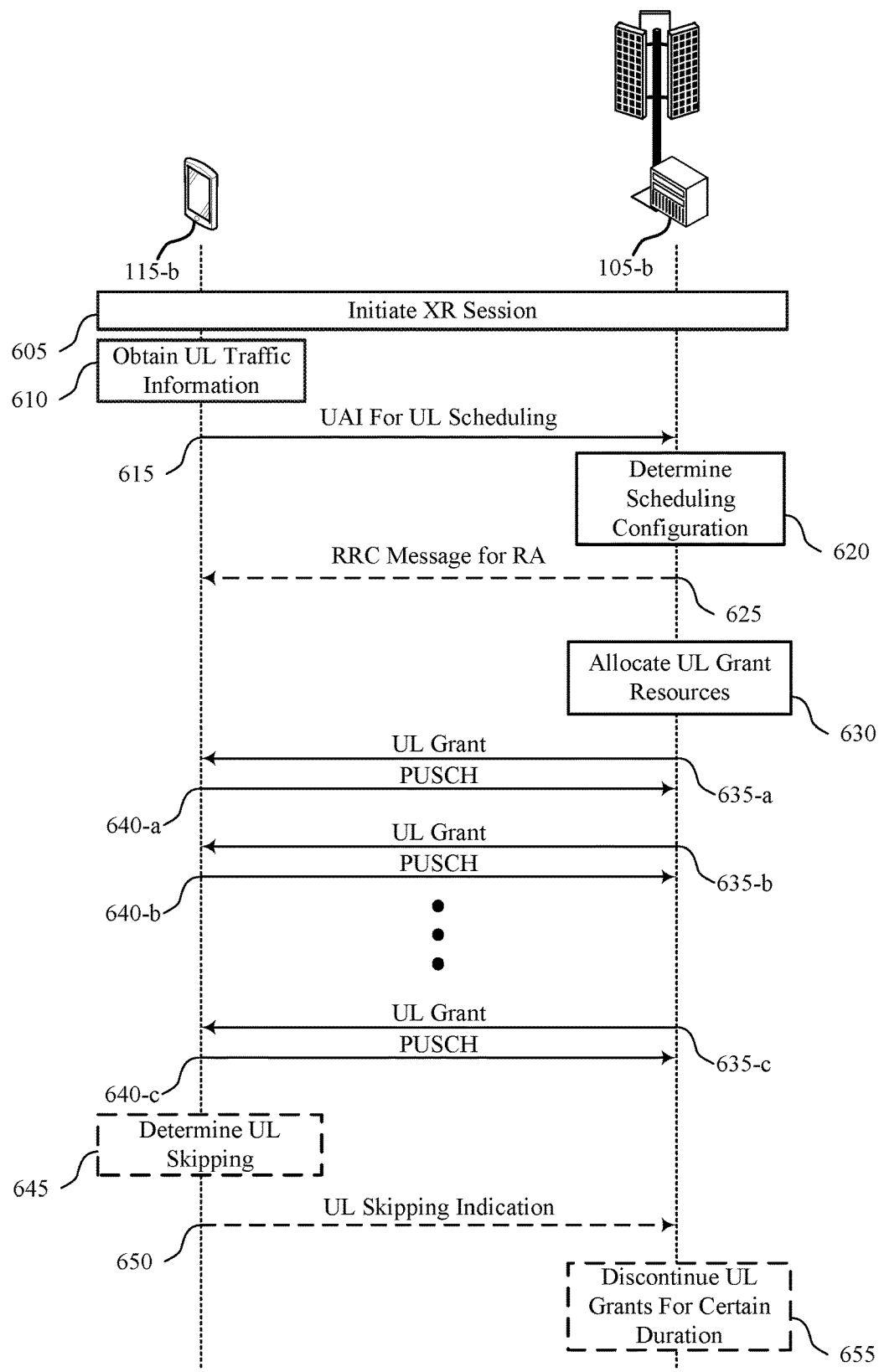
FIG. 6 illustrates an example of a process flow that supports UE indication of uplink scheduling parameters in wireless communications in accordance with aspects of the present disclosure.

FIG. 6 illustrates an example of a process flow 600 that supports UE indication of uplink scheduling parameters in wireless communications in accordance with aspects of the present disclosure. In some examples, process flow 600 may implement aspects of wireless communications system 100 and the wireless communications system 200 described with reference to FIGS. 1 and 2, respectively. The process flow 600 may be based on a configuration by a base station 105-*b* and implemented by a UE 115-*b* to promote power saving for the UE 115-*b* by alignment of uplink and downlink communications, and to promote efficient resource usage through efficient and accurate scheduling of communications resources for an XR flow. The process flow 600 may be implemented to promote high reliability and low latency communications (e.g., transmission of position information and control information of the UE 115-*b* for an XR application), among other benefits.

In the following description of the process flow 600, the operations between the base station 105-*b* and the UE 115-*b* may be transmitted in a different order than the example order shown, or the operations performed by the base station 105-*b* and the UE 115-*b* may be performed in different orders or at different times. Some operations may also be omitted from the process flow 600, and other operations may be added to the process flow 600. The base station 105-*b* and the UE 115-*b* may be examples of a base station 105 and a UE 115 as described herein.

At 605, the base station 105-*b* and the UE 115-*b* may initiate an XR session. In some cases, the XR session may be initiated based on the UE 115-*b* entering into communications to exchange XR traffic with an XR server via communications through the base station 105-*b*. At 610, the UE 115-*b* may obtain uplink traffic information. In some cases, the uplink traffic information may be based on pose/control information and periodicity for an XR traffic flow.

At 615, the UE 115-*b* may transmit UAI for uplink scheduling. The UAI may include one or more uplink scheduling parameters, as discussed herein. At 620, the base station 105-*b* may determine a scheduling configuration for the UE 115-*b*. The scheduling configuration may include a set of periodic uplink grants and a set of periodic downlink grants that are identified based at least in part on the UAI. Optionally, at 625, the base station 105-*b* may transmit a RRC message for random access. At 630, the base station 105-*b* may allocate uplink grant resources to the UE 115-*b*. A number of instance of uplink grants may be provided to the UE 115-*b* at 635-*a*, 635-*b*, and 635-*c*, and a number of instances of PUSCH transmissions may be transmitted by the UE 115-*b* at 640-*a*, 640-*b*, and 640-*c*, in accordance with techniques as discussed herein.

Optionally, at 645, the UE 115-*b* may determine that uplink skipping is to be used. For example, the UE 115-*b* may determine that uplink data is not to be transmitted in a PUSCH, such as due to an empty uplink buffer. At 650, in such cases, the UE 115-*b* may transmit an uplink skipping indication. At 655, the base station 105-*b* may receive the uplink skipping indication, and determine to discontinue providing uplink grants and associated PDCCH transmissions for a certain duration. The period of the certain duration may be a predetermined period or may correspond to a period until a next uplink burst, as discussed herein.

Figure 7:
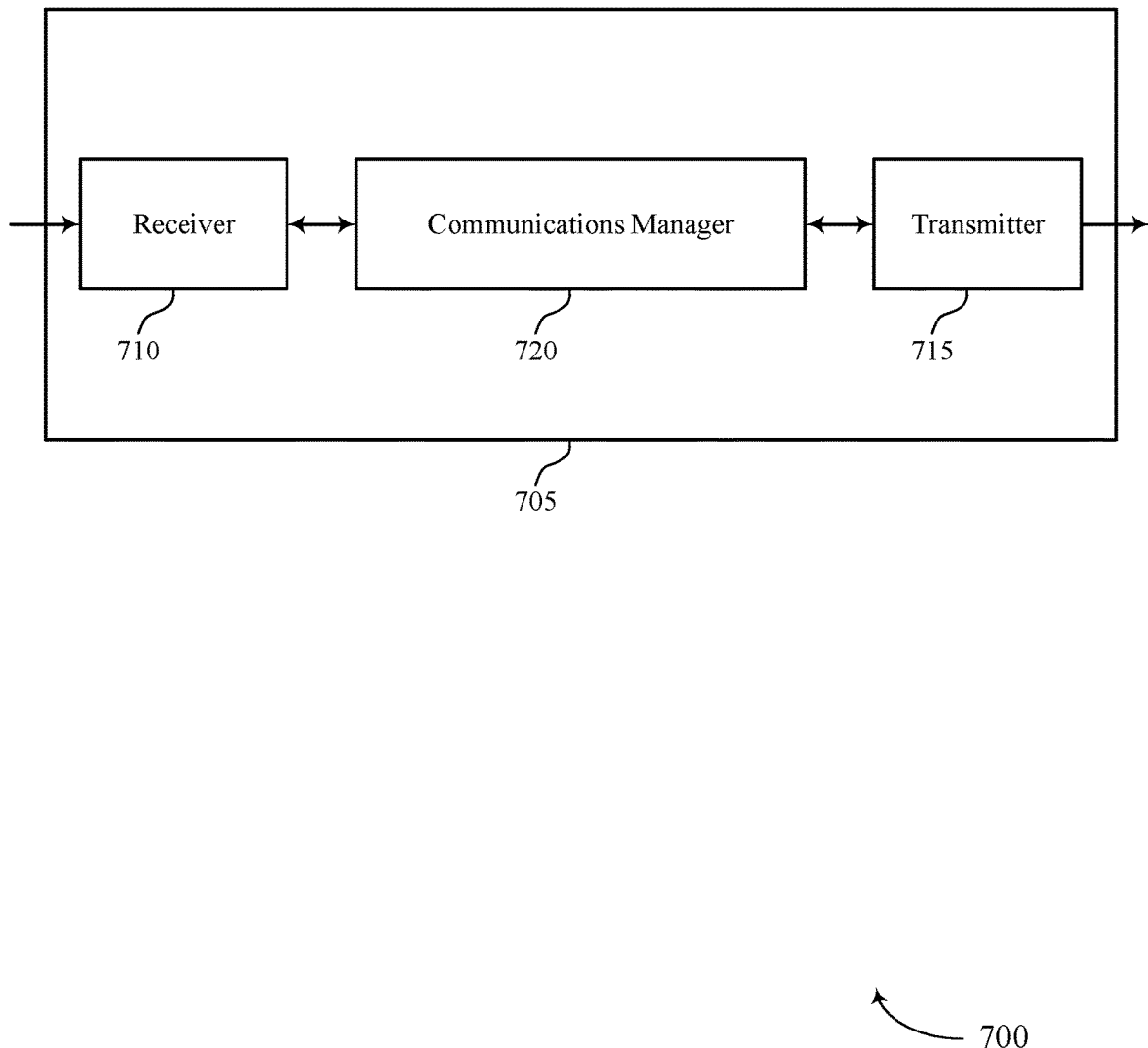
FIGS. 7 and 8 show block diagrams of devices that support UE indication of uplink scheduling parameters in wireless communications in accordance with aspects of the present disclosure.

FIG. 7 shows a block diagram 700 of a device 705 that supports UE indication of uplink scheduling parameters in wireless communications in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to UE indication of uplink scheduling parameters in wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to UE indication of uplink scheduling parameters in wireless communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of UE indication of uplink scheduling parameters in wireless communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the at least one processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software) executed by a processor. If implemented in code executed by a processor, the functions of the communications manager 720, the receiver 710, the transmitter 715, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for transmitting, responsive to an initiation of a traffic session (e.g., an extended reality session) at the UE, uplink scheduling information to a base station, the uplink scheduling information indicating one or more scheduling parameters associated with a pattern of uplink wireless resources for uplink data that is to be transmitted from the UE to the base station during the traffic session. The communications manager 720 may be configured as or otherwise support a means for communicating with the base station to transmit or receive data associated with the traffic session based at least in part on the uplink scheduling information.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for uplink scheduling information indications that may provide power saving improvements to the UE, more accurate scheduling of uplink resources at the UE, which may reduce processing requirements for PDCCH decoding, provide higher reliability and lower latency for XR-related operations, and enhanced user experience, among other benefits.

Figure 8:
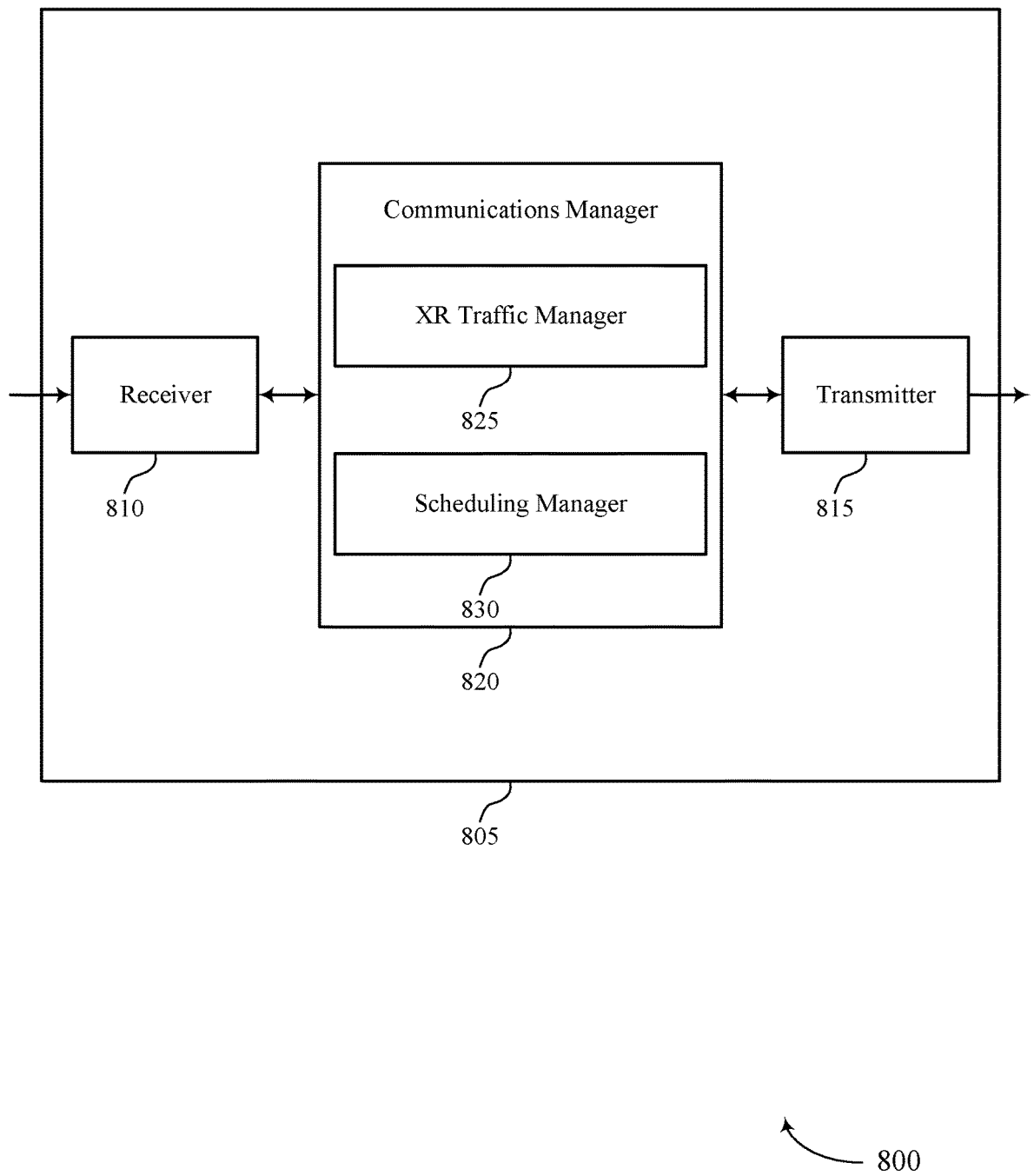

FIG. 8 shows a block diagram 800 of a device 805 that supports UE indication of uplink scheduling parameters in wireless communications in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to UE indication of uplink scheduling parameters in wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to UE indication of uplink scheduling parameters in wireless communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of UE indication of uplink scheduling parameters in wireless communications as described herein. For example, the communications manager 820 may include an XR traffic manager 825 a scheduling manager 830, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The XR traffic manager 825 may be configured as or otherwise support a means for transmitting, responsive to an initiation of a traffic session (e.g., an extended reality session) at the UE, uplink scheduling information to a base station, the uplink scheduling information indicating one or more scheduling parameters associated with a pattern of uplink wireless resources for uplink data that is to be transmitted from the UE to the base station during the traffic session. The scheduling manager 830 may be configured as or otherwise support a means for communicating with the base station to transmit or receive data associated with the traffic session based at least in part on the uplink scheduling information.

Figure 9:
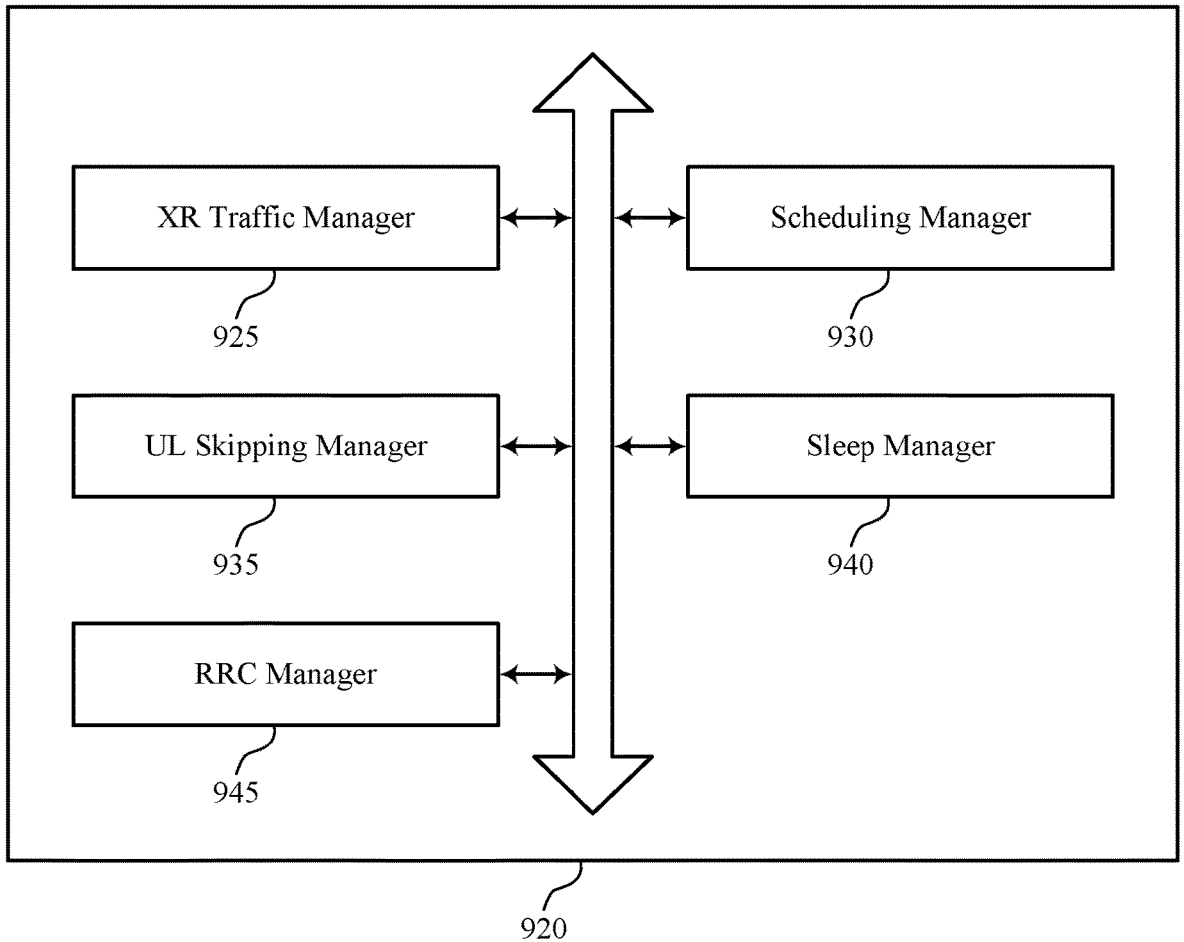
FIG. 9 shows a block diagram of a communications manager that supports UE indication of uplink scheduling parameters in wireless communications in accordance with aspects of the present disclosure.

FIG. 9 shows a block diagram 900 of a communications manager 920 that supports UE indication of uplink scheduling parameters in wireless communications in accordance with aspects of the present disclosure. The communications manager 920 may be an example of aspects of a communications manager 720, a communications manager 820, or both, as described herein. The communications manager 920, or various components thereof, may be an example of means for performing various aspects of UE indication of uplink scheduling parameters in wireless communications as described herein. For example, the communications manager 920 may include an XR traffic manager 925, a scheduling manager 930, a UL skipping manager 935, a sleep manager 940, an RRC manager 945, or any combination thereof. Each of these components may communicate, directly or indirectly, with one another (e.g., via one or more buses).

The communications manager 920 may support wireless communication at a UE in accordance with examples as disclosed herein. The XR traffic manager 925 may be configured as or otherwise support a means for transmitting, responsive to an initiation of a traffic session at the UE, uplink scheduling information to a base station, the uplink scheduling information indicating one or more scheduling parameters associated with a pattern of uplink wireless resources for uplink data that is to be transmitted from the UE to the base station during the traffic session. The scheduling manager 930 may be configured as or otherwise support a means for communicating with the base station to transmit or receive data associated with the traffic session based at least in part on the uplink scheduling information.

In some examples, to support transmitting the uplink scheduling information, the XR traffic manager 925 may be configured as or otherwise support a means for transmitting, to the base station, one or more of a UE assistance information (UAI) communication that indicates parameters for the pattern of uplink resources or an uplink skipping indication that one or more proactive uplink grants are to be skipped by the UE.

In some examples, the UAI is associated with an extended reality session and includes one or more of a requested periodicity of uplink traffic, a requested offset of uplink traffic, a requested data size for uplink traffic for each time period associated with the extended reality session, a request to enable uplink transmission skipping, or any combinations thereof. In some examples, the UAI includes one or more of a requested periodicity of uplink grants, a requested offset of uplink grants, a requested data size for each time period associated with the extended reality session, a request to enable uplink transmission skipping, or any combinations thereof.

In some examples, the scheduling manager 930 may be configured as or otherwise support a means for receiving, from the base station, an uplink scheduling pattern that is based at least in part on the UAI.

In some examples, the sleep manager 940 may be configured as or otherwise support a means for transitioning to a sleep mode between consecutive uplink grants based at least in part on the uplink scheduling pattern. In some examples, the uplink scheduling pattern provides that uplink communications to the base station and downlink communications from the base station are coordinated to provide additional duration of the sleep mode relative to cases where UAI is unused in deriving the uplink scheduling pattern. In some examples, at least a portion of the uplink scheduling pattern is received in RRC signaling. In some examples, the uplink scheduling pattern provides one or more of a configured grant for the UE, an enablement of uplink transmission skipping, a sounding reference signal configuration, a channel state information report configuration, a DRX configuration, or any combinations thereof. In some examples, the enablement of uplink transmission skipping indicates that the UE can skip an uplink shared channel communication when the UE does not have uplink data to transmit.

In some examples, the scheduling manager 930 may be configured as or otherwise support a means for receiving, from the base station, one or more proactive grants for one or more uplink communications. In some examples, the UL skipping manager 935 may be configured as or otherwise support a means for where the uplink scheduling information provides an uplink skipping indication that one or more subsequent proactive grants will be unmonitored by the UE. In some examples, the uplink skipping indication identifies that the one or more subsequent proactive grants will be unmonitored for a first time period or until a specific time. In some examples, the first time period or the specific time correspond to a start of a subsequent downlink burst of the traffic session.

In some examples, the uplink skipping indication is an explicit indication provided in a scheduling request that is transmitted to the base station. In some examples, the uplink skipping indication is provided in a medium access control (MAC) control element (CE) in which a BSR indication is set to zero. In some examples, the uplink skipping indication is provided by setting an inactivity timer of the UE to a value that initiates a DRX sleep state. In some examples, the uplink skipping indication is provided as a layer-one request that is transmitted in uplink control information to the base station.

Figure 10:
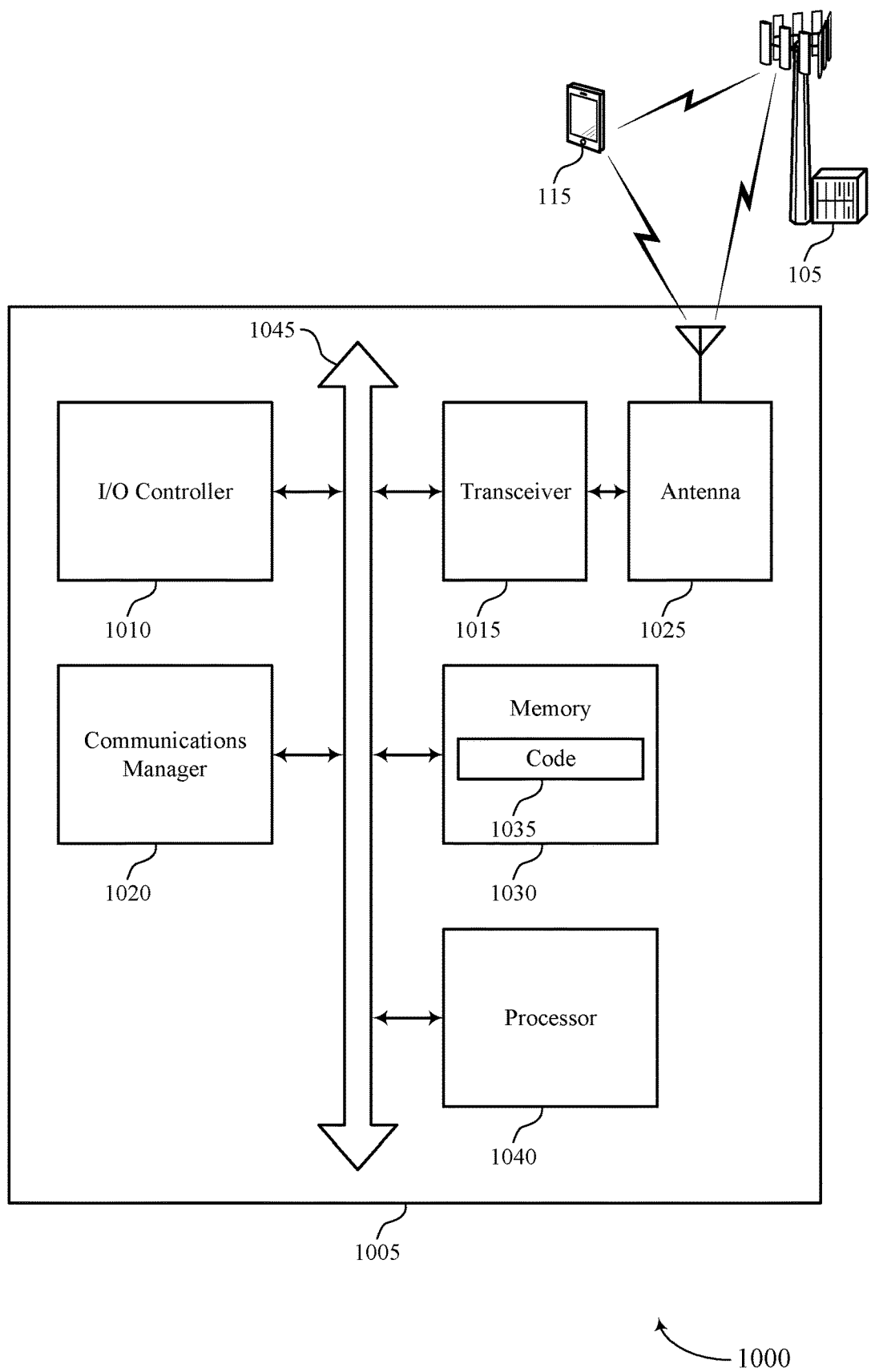
FIG. 10 shows a diagram of a system including a device that supports UE indication of uplink scheduling parameters in wireless communications in accordance with aspects of the present disclosure.

FIG. 10 shows a diagram of a system 1000 including a device 1005 that supports UE indication of uplink scheduling parameters in wireless communications in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting UE indication of uplink scheduling parameters in wireless communications). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for transmitting, responsive to an initiation of a traffic session (e.g., an extended reality session) at the UE, uplink scheduling information to a base station, the uplink scheduling information indicating one or more scheduling parameters associated with a pattern of uplink wireless resources for uplink data that is to be transmitted from the UE to the base station during the traffic session. The communications manager 1020 may be configured as or otherwise support a means for communicating with the base station to transmit or receive data associated with the traffic session based at least in part on the uplink scheduling information.

By including or configuring the communications manager 1020 in accordance with examples as described herein, the device 1005 may support techniques for indications of uplink scheduling information that may provide power saving improvements to the UE (e.g., through increased durations of sleep periods), may allow for more accurate scheduling of uplink resources at the UE, may promote higher reliability and lower latency for XR-related operations, and provide enhanced user experience, among other benefits. Further, UE indication of PUSCH skipping may allow a base station to discontinue associated PDCCH transmissions, and thereby allow associated resources to be allocated for other communications, allowing for enhancements in network resource usage which may further promote higher reliability, lower latency, and enhance overall network capacity.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of UE indication of uplink scheduling parameters in wireless communications as described herein, or the processor 1040 and the memory 1030 may be otherwise configured to perform or support such operations.

Figure 11:
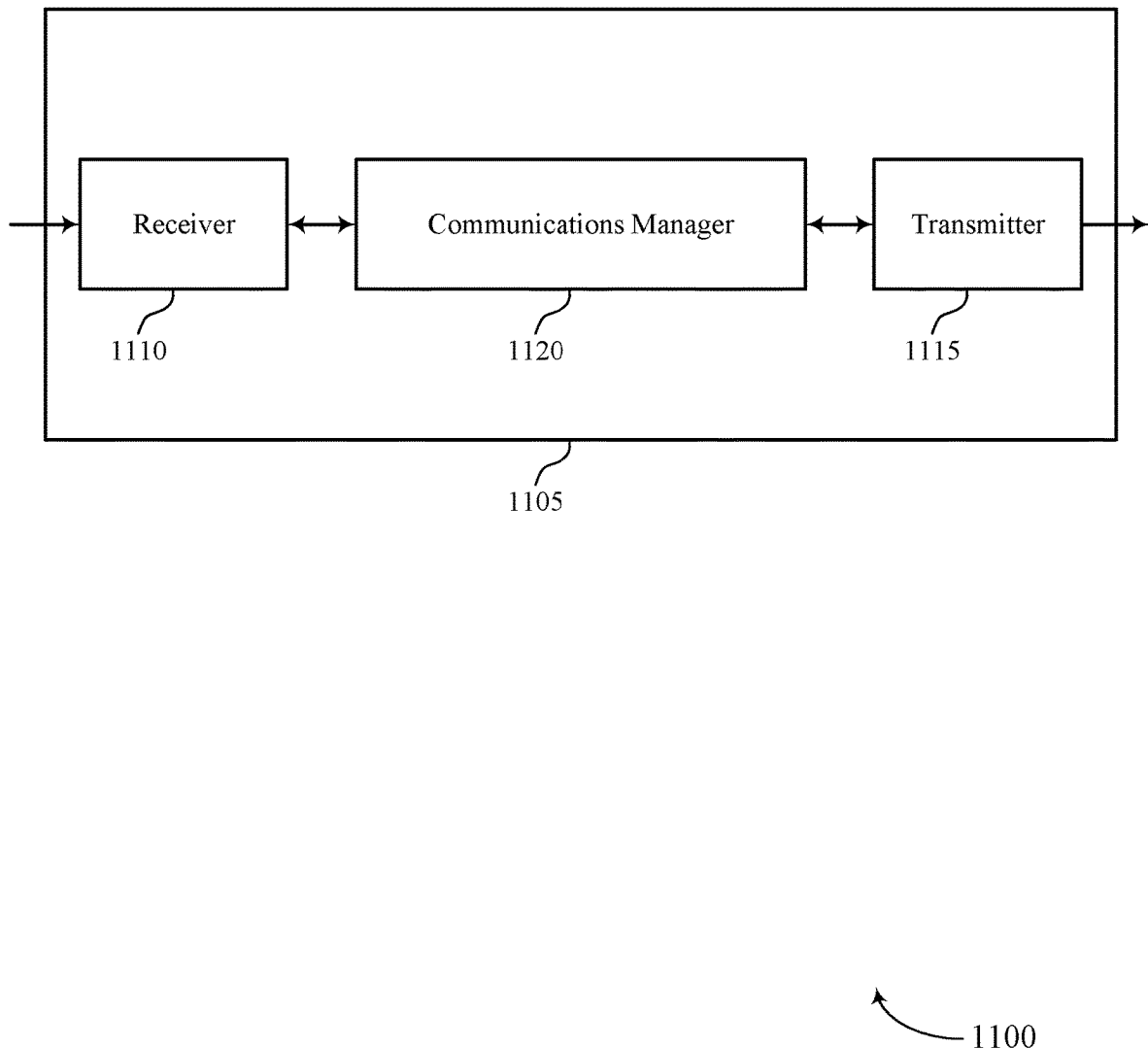
FIGS. 11 and 12 show block diagrams of devices that support UE indication of uplink scheduling parameters in wireless communications in accordance with aspects of the present disclosure.

FIG. 11 shows a block diagram 1100 of a device 1105 that supports UE indication of uplink scheduling parameters in wireless communications in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to UE indication of uplink scheduling parameters in wireless communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to UE indication of uplink scheduling parameters in wireless communications). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of UE indication of uplink scheduling parameters in wireless communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software) executed by a processor. If implemented in code executed by a processor, the functions of the communications manager 1120, the receiver 1110, the transmitter 1115, or various combinations or components thereof may be performed by a general-purpose processor, a DSP, a CPU, a GPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for receiving, from a UE responsive to an initiation of a traffic session at the UE, uplink scheduling information that indicates one or more scheduling parameters associated with a pattern of uplink wireless resources for uplink data that is to be transmitted from the UE to the base station during the traffic session. The communications manager 1120 may be configured as or otherwise support a means for communicating with the UE to receive or transmit data associated with the traffic session based at least in part on the uplink scheduling information.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for indications of uplink scheduling information that may provide power saving improvements to the UE, may allow for more accurate scheduling of uplink resources, may promote higher reliability and lower latency for XR-related operations, and provide enhanced user experience, among other benefits.

Figure 12:
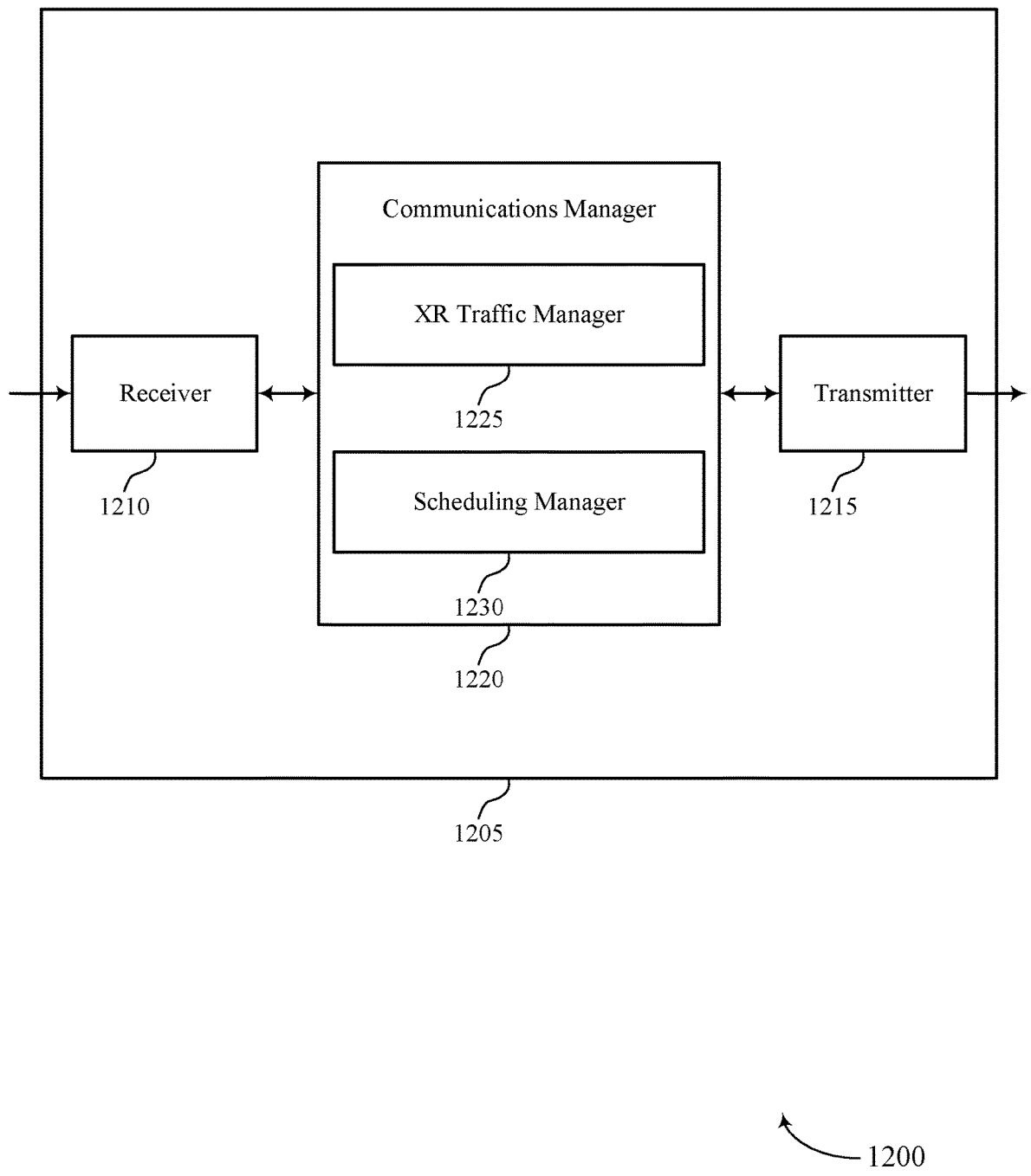

FIG. 12 shows a block diagram 1200 of a device 1205 that supports UE indication of uplink scheduling parameters in wireless communications in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to UE indication of uplink scheduling parameters in wireless communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to UE indication of uplink scheduling parameters in wireless communications). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of UE indication of uplink scheduling parameters in wireless communications as described herein. For example, the communications manager 1220 may include an XR traffic manager 1225 a scheduling manager 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The XR traffic manager 1225 may be configured as or otherwise support a means for receiving, from a UE responsive to an initiation of a traffic session at the UE, uplink scheduling information that indicates one or more scheduling parameters associated with a pattern of uplink wireless resources for uplink data that is to be transmitted from the UE to the base station during the traffic session. The scheduling manager 1230 may be configured as or otherwise support a means for communicating with the UE to receive or transmit data associated with the traffic session based at least in part on the uplink scheduling information.

Figure 13:
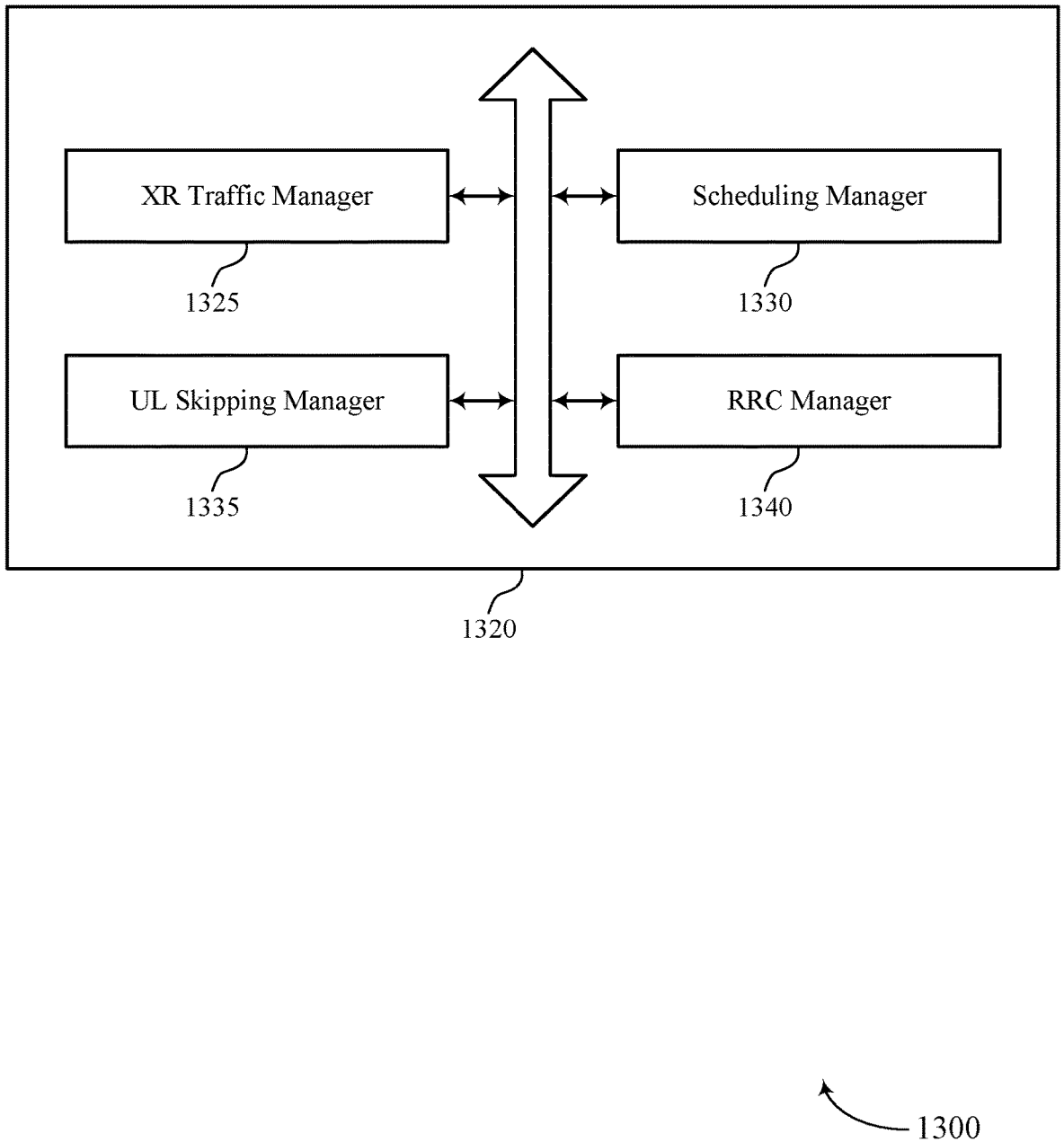
FIG. 13 shows a block diagram of a communications manager that supports UE indication of uplink scheduling parameters in wireless communications in accordance with aspects of the present disclosure.

FIG. 13 shows a block diagram 1300 of a communications manager 1320 that supports UE indication of uplink scheduling parameters in wireless communications in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of UE indication of uplink scheduling parameters in wireless communications as described herein. For example, the communications manager 1320 may include an XR traffic manager 1325, a scheduling manager 1330, a UL skipping manager 1335, an RRC manager 1340, or any combination thereof. Each of these components may communicate, directly or indirectly, with one another (e.g., via one or more buses).

The communications manager 1320 may support wireless communication at a base station in accordance with examples as disclosed herein. The XR traffic manager 1325 may be configured as or otherwise support a means for receiving, from a UE responsive to an initiation of a traffic session at the UE, uplink scheduling information that indicates one or more scheduling parameters associated with a pattern of uplink wireless resources for uplink data that is to be transmitted from the UE to the base station during the traffic session. The scheduling manager 1330 may be configured as or otherwise support a means for communicating with the UE to receive or transmit data associated with the traffic session based at least in part on the uplink scheduling information. In some examples, the uplink scheduling information includes one or more of a UE assistance information (UAI) communication that indicates parameters for the pattern of uplink resources or an uplink skipping indication that one or more proactive uplink grants are to be skipped by the UE. In some examples, the UAI is associated with an extended reality session and includes one or more of a requested periodicity of uplink traffic, a requested offset of uplink traffic, a requested data size for uplink traffic for each time period associated with the extended reality session, a request to enable uplink transmission skipping, or any combinations thereof. In some examples, the UAI includes one or more of a requested periodicity of uplink grants, a requested offset of uplink grants, a requested data size for each time period associated with the extended reality session, a request to enable uplink transmission skipping, or any combinations thereof.

In some examples, the scheduling manager 1330 may be configured as or otherwise support a means for transmitting, to the UE, an uplink scheduling pattern that is based at least in part on the UAI. In some examples, the uplink scheduling pattern provides that uplink communications from the UE and downlink communications to the UE are coordinated to provide additional duration of a sleep mode at the UE relative to cases where UAI is unused in deriving the uplink scheduling pattern. In some examples, at least a portion of the uplink scheduling pattern is transmitted to the UE in RRC signaling. In some examples, the uplink scheduling pattern provides one or more of a configured grant for the UE, an enablement of uplink transmission skipping, a sounding reference signal configuration, a channel state information report configuration, a DRX configuration, or any combinations thereof. In some examples, the enablement of uplink transmission skipping indicates that the UE can skip an uplink shared channel communication when the UE does not have uplink data to transmit.

In some examples, the UL skipping manager 1335 may be configured as or otherwise support a means for transmitting, to the UE, one or more proactive grants for one or more uplink communications associated with the traffic session, and where the uplink scheduling information provides an uplink skipping indication that one or more subsequent proactive grants will be unmonitored by the UE. In some examples, the scheduling manager 1330 may be configured as or otherwise support a means for discontinuing transmitting the one or more proactive grants to the UE responsive to the uplink skipping indication.

In some examples, the uplink skipping indication identifies that the one or more subsequent proactive grants will be unmonitored for a first time period or until a specific time, and where the transmitting of the one or more proactive grants is discontinued for the first time period or until the specific time. In some examples, the first time period or the specific time correspond to a start of a subsequent downlink burst of the traffic session. In some examples, the uplink skipping indication is an explicit indication provided in a scheduling request that is received from the UE. In some examples, the uplink skipping indication is provided in a MAC-CE in which a BSR indication is set to zero. In some examples, the uplink skipping indication is provided by setting an inactivity timer of the UE to a value that initiates a DRX sleep state. In some examples, the uplink skipping indication is provided as a layer-one request that is transmitted in uplink control information from the UE.

Figure 14:
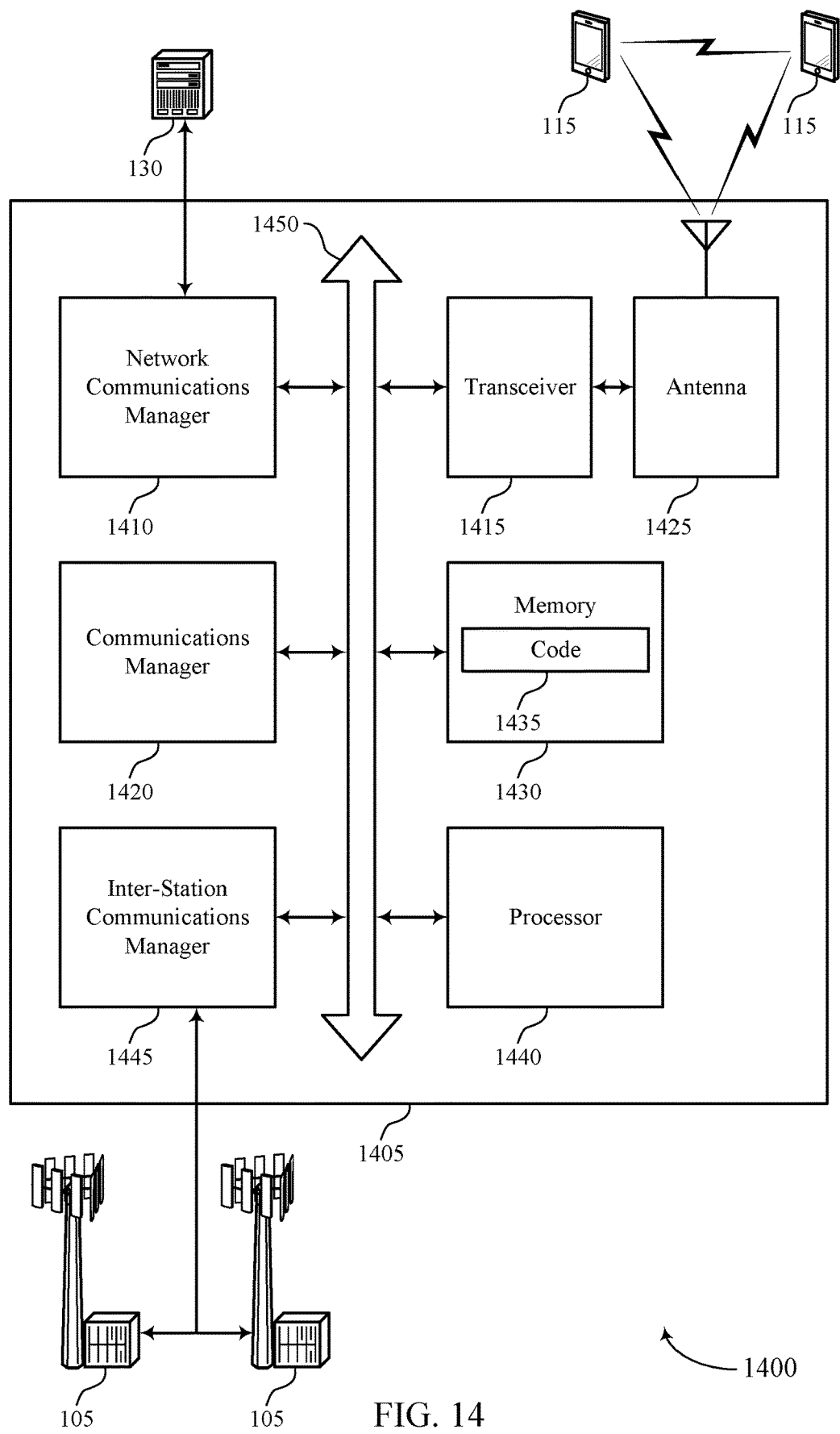
FIG. 14 shows a diagram of a system including a device that supports UE indication of uplink scheduling parameters in wireless communications in accordance with aspects of the present disclosure.

FIG. 14 shows a diagram of a system 1400 including a device 1405 that supports UE indication of uplink scheduling parameters in wireless communications in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting UE indication of uplink scheduling parameters in wireless communications). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for receiving, from a UE responsive to an initiation of a traffic session (e.g., an extended reality session) at the UE, uplink scheduling information that indicates one or more scheduling parameters associated with a pattern of uplink wireless resources for uplink data that is to be transmitted from the UE to the base station during the traffic session. The communications manager 1420 may be configured as or otherwise support a means for communicating with the UE to receive or transmit data associated with the traffic session based at least in part on the uplink scheduling information.

By including or configuring the communications manager 1420 in accordance with examples as described herein, the device 1405 may support techniques for indications of uplink scheduling information that may provide power saving improvements to the UE (e.g., through increased durations of sleep periods), may allow for more accurate scheduling of uplink and downlink resources, may promote higher reliability and lower latency for wireless communications as well as for XR-related operations, and provide enhanced user experience, among other benefits. Further, UE indication of PUSCH skipping may allow the base station to discontinue associated PDCCH transmissions, and thereby allow associated resources to be allocated for other communications, allowing for enhancements in network resource usage which may further promote higher reliability, lower latency, and enhance overall network capacity.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of UE indication of uplink scheduling parameters in wireless communications as described herein, or the processor 1440 and the memory 1430 may be otherwise configured to perform or support such operations.

Figure 15:
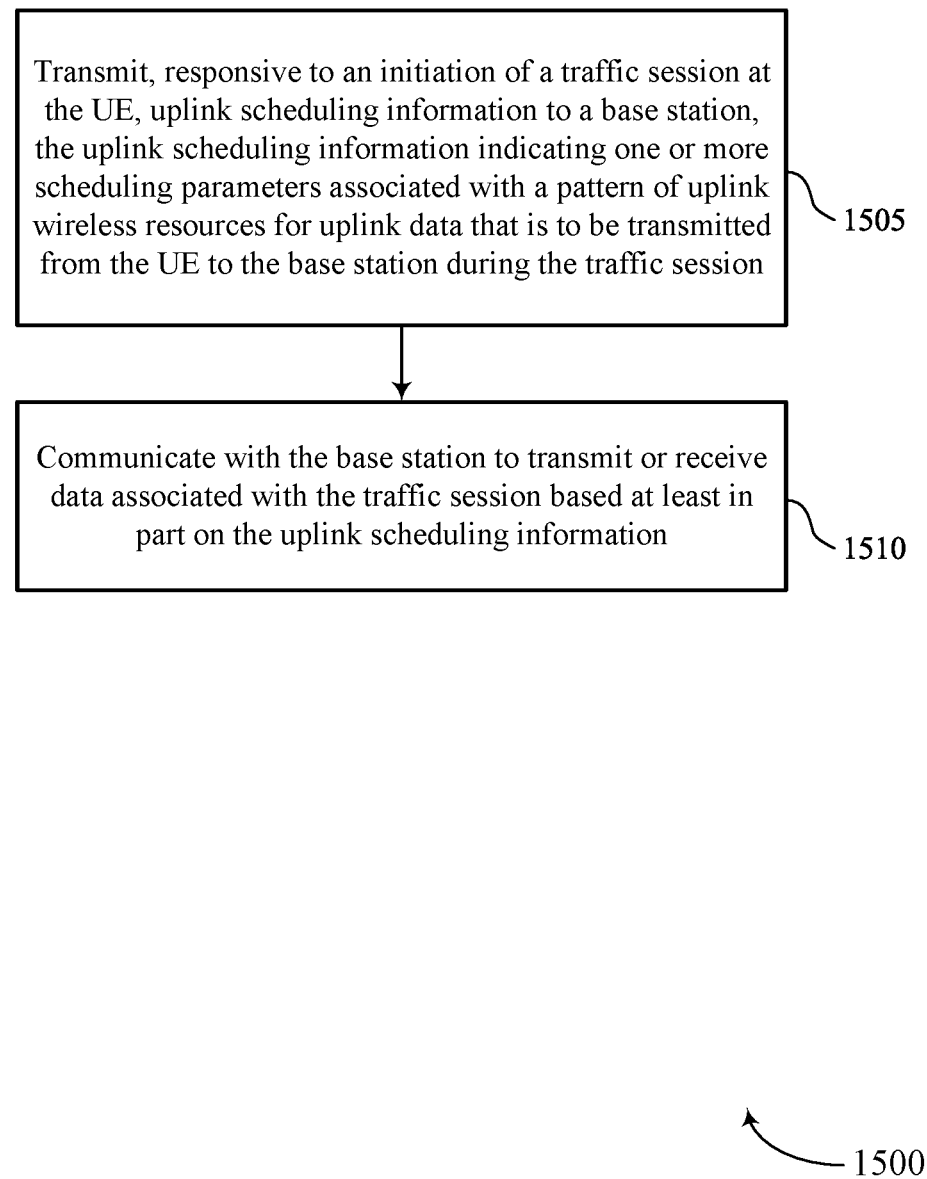
FIGS. 15 through 20 show flowcharts illustrating methods that support UE indication of uplink scheduling parameters in wireless communications in accordance with aspects of the present disclosure.

FIG. 15 shows a flowchart illustrating a method 1500 that supports UE indication of uplink scheduling parameters in wireless communications in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include transmitting, responsive to an initiation of a traffic session at the UE, uplink scheduling information to a base station, the uplink scheduling information indicating one or more scheduling parameters associated with a pattern of uplink wireless resources for uplink data that is to be transmitted from the UE to the base station during the traffic session. The operations of 1505 may be performed in accordance with examples as disclosed herein. In some examples, aspects of the operations of 1505 may be performed by an XR traffic manager 925 as described with reference to FIG. 9.

At 1510, the method may include communicating with the base station to transmit or receive data associated with the traffic session based at least in part on the uplink scheduling information. The operations of 1510 may be performed in accordance with examples as disclosed herein. In some examples, aspects of the operations of 1510 may be performed by a scheduling manager 930 as described with reference to FIG. 9.

Figure 16:
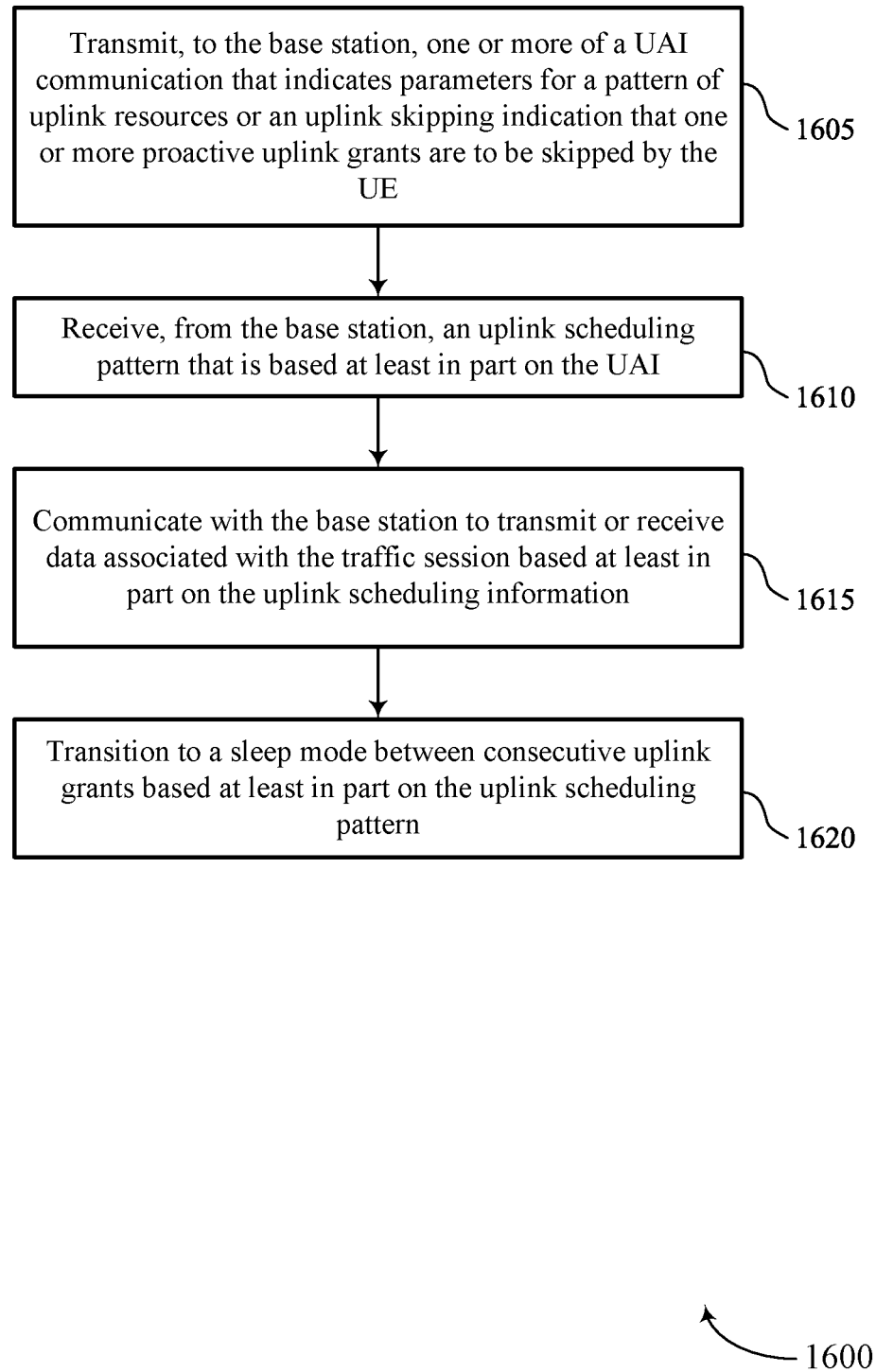

FIG. 16 shows a flowchart illustrating a method 1600 that supports UE indication of uplink scheduling parameters in wireless communications in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include transmitting, to the base station, one or more of a UAI communication that indicates parameters for the pattern of uplink resources or an uplink skipping indication that one or more proactive uplink grants are to be skipped by the UE. The operations of 1605 may be performed in accordance with examples as disclosed herein.

In some examples, aspects of the operations of 1605 may be performed by an XR traffic manager 925 as described with reference to FIG. 9.

At 1610, the method may include receiving, from the base station, an uplink scheduling pattern that is based at least in part on the UAI. The operations of 1610 may be performed in accordance with examples as disclosed herein. In some examples, aspects of the operations of 1610 may be performed by a scheduling manager 930 as described with reference to FIG. 9.

At 1615, the method may include communicating with the base station to transmit or receive data associated with the traffic session based at least in part on the uplink scheduling information. The operations of 1615 may be performed in accordance with examples as disclosed herein. In some examples, aspects of the operations of 1615 may be performed by a scheduling manager 930 as described with reference to FIG. 9.

At 1620, the method may include transitioning to a sleep mode between consecutive uplink grants based at least in part on the uplink scheduling pattern. The operations of 1620 may be performed in accordance with examples as disclosed herein. In some examples, aspects of the operations of 1620 may be performed by a sleep manager 940 as described with reference to FIG. 9.

Figure 17:
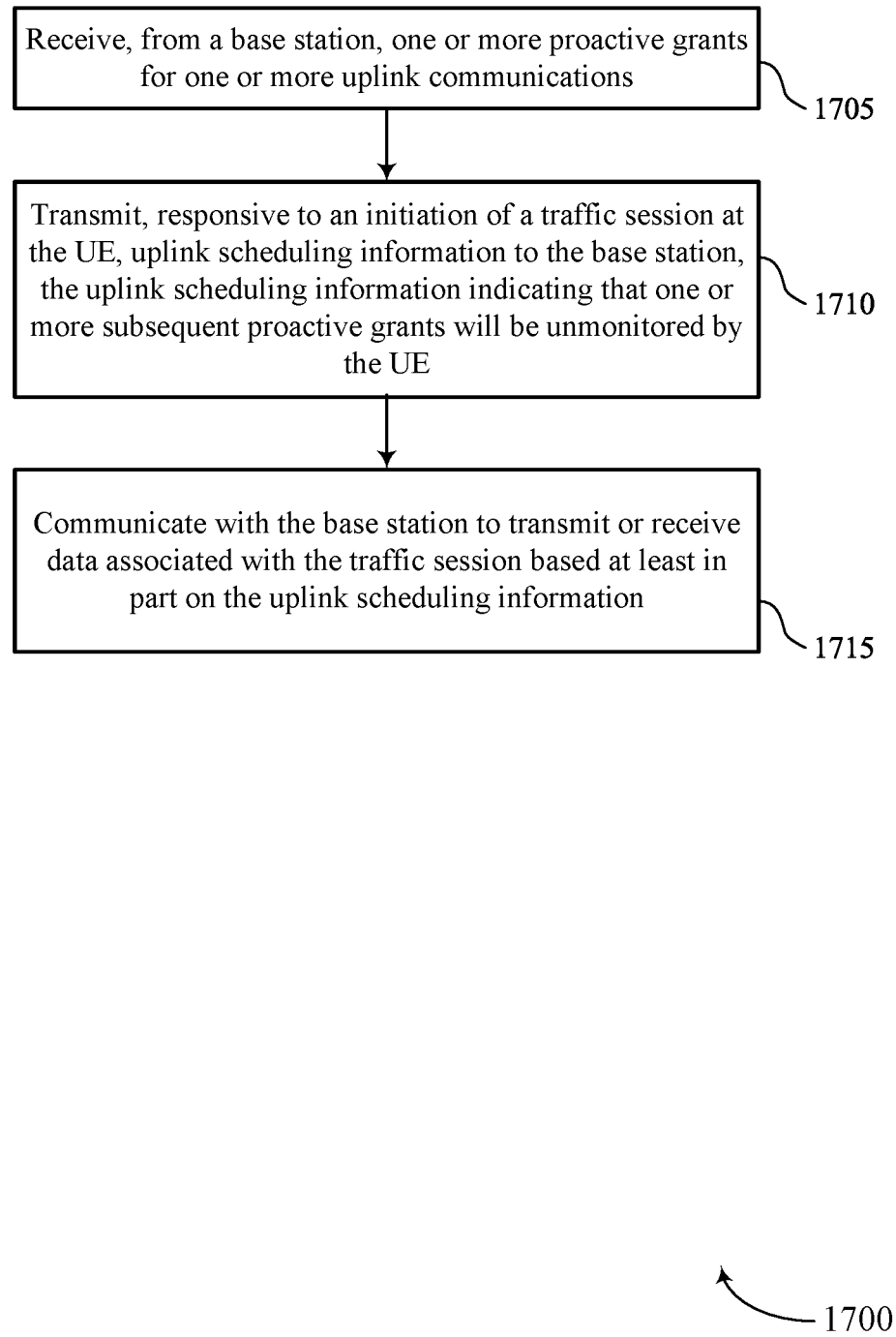

FIG. 17 shows a flowchart illustrating a method 1700 that supports UE indication of uplink scheduling parameters in wireless communications in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, one or more proactive grants for one or more uplink communications. The operations of 1705 may be performed in accordance with examples as disclosed herein. In some examples, aspects of the operations of 1705 may be performed by a scheduling manager 930 as described with reference to FIG. 9.

At 1710, the method may include transmitting, responsive to an initiation of a traffic session at the UE, uplink scheduling information to the base station, the uplink scheduling information indicating that one or more subsequent proactive grants will be unmonitored by the UE. The operations of 1710 may be performed in accordance with examples as disclosed herein. In some examples, aspects of the operations of 1710 may be performed by an UL skipping manager 935 as described with reference to FIG. 9.

At 1715, the method may include communicating with the base station to transmit or receive data associated with the traffic session based at least in part on the uplink scheduling information. The operations of 1715 may be performed in accordance with examples as disclosed herein. In some examples, aspects of the operations of 1715 may be performed by a scheduling manager 930 as described with reference to FIG. 9.

Figure 18:
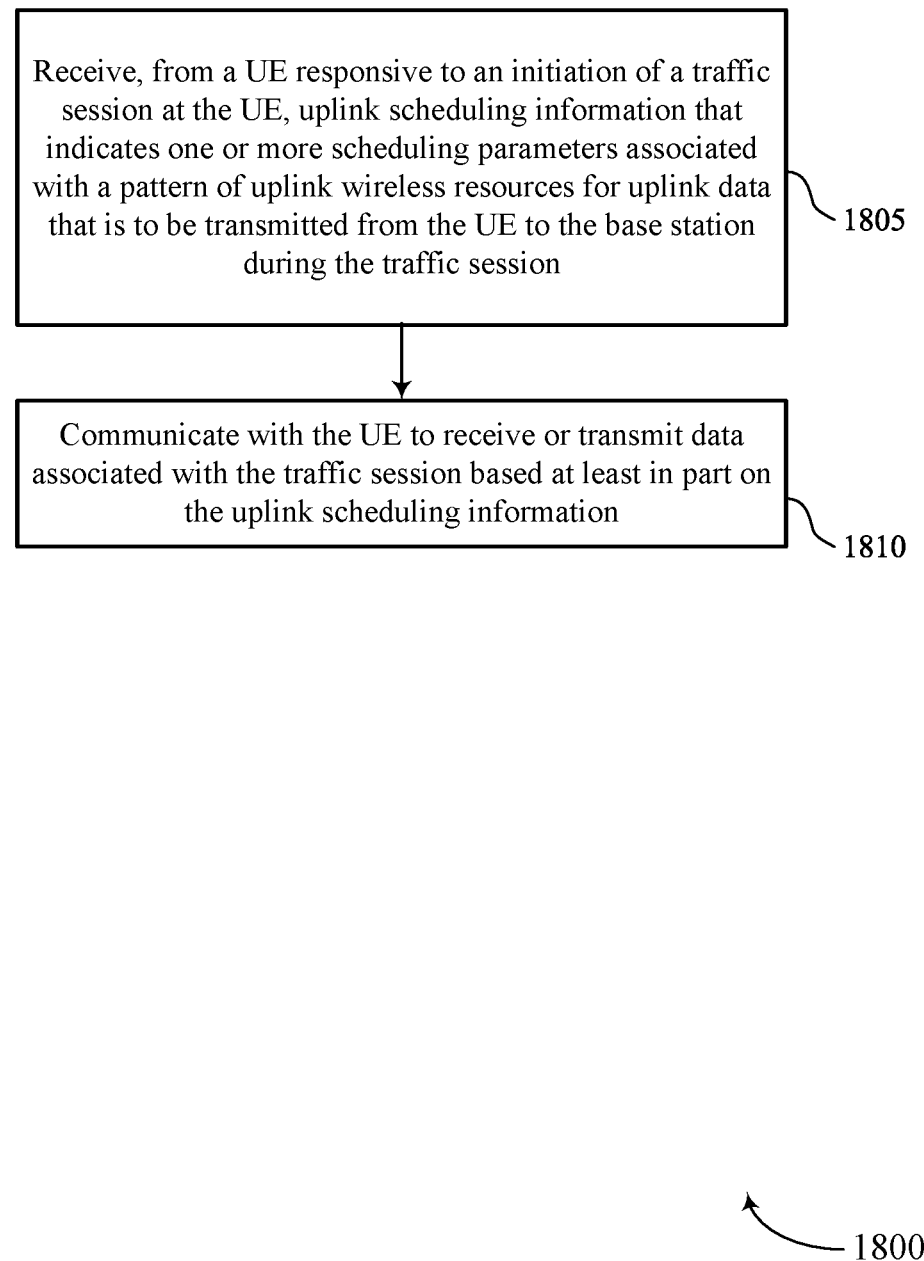

FIG. 18 shows a flowchart illustrating a method 1800 that supports UE indication of uplink scheduling parameters in wireless communications in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include receiving, from a UE responsive to an initiation of a traffic session at the UE, uplink scheduling information that indicates one or more scheduling parameters associated with a pattern of uplink wireless resources for uplink data that is to be transmitted from the UE to the base station during the traffic session. The operations of 1805 may be performed in accordance with examples as disclosed herein. In some examples, aspects of the operations of 1805 may be performed by an XR traffic manager 1325 as described with reference to FIG. 13. In some cases, the uplink scheduling information includes one or more of a UAI communication that indicates parameters for the pattern of uplink resources or an uplink skipping indication that one or more proactive uplink grants are to be skipped by the UE.

At 1810, the method may include communicating with the UE to receive or transmit data associated with the traffic session based at least in part on the uplink scheduling information. The operations of 1810 may be performed in accordance with examples as disclosed herein. In some examples, aspects of the operations of 1810 may be performed by a scheduling manager 1330 as described with reference to FIG. 13.

Figure 19:
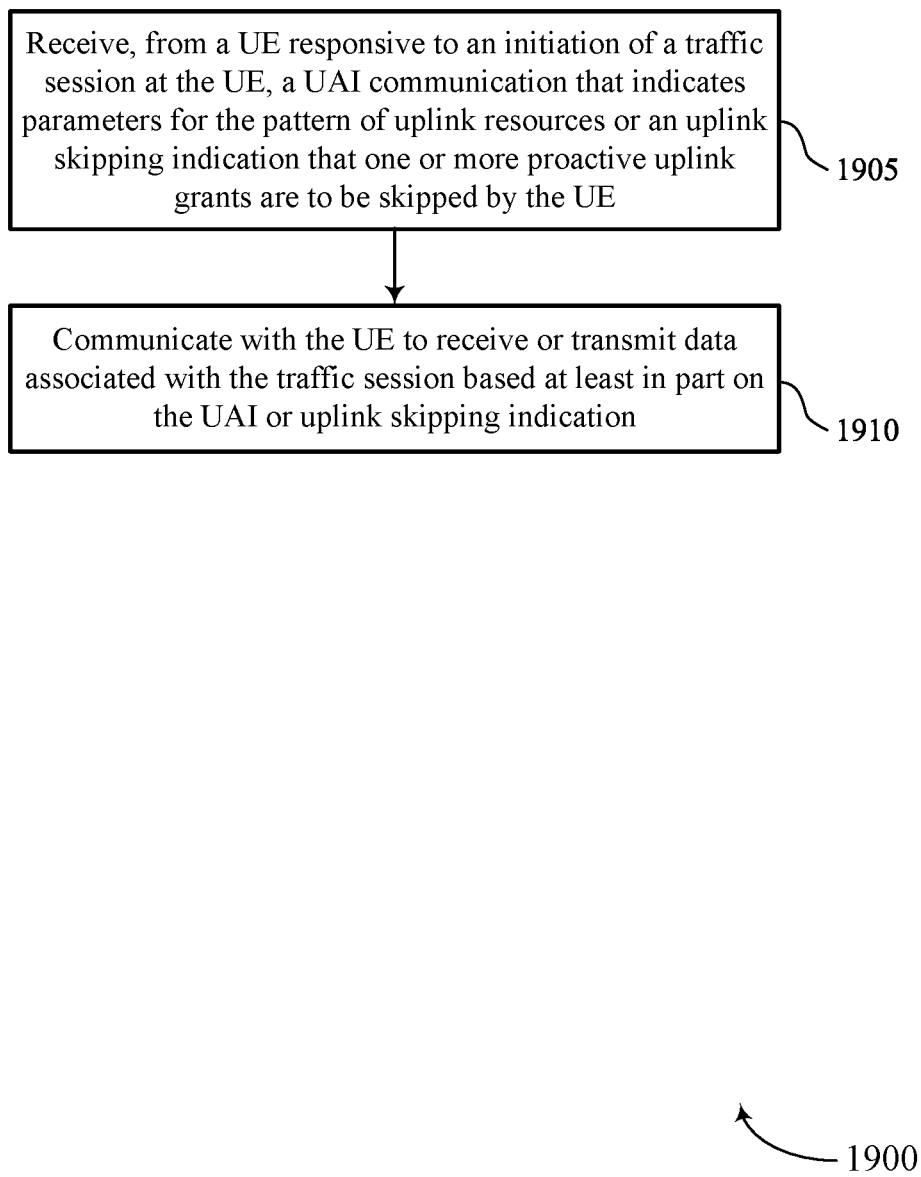

FIG. 19 shows a flowchart illustrating a method 1900 that supports UE indication of uplink scheduling parameters in wireless communications in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include receiving, from a UE responsive to an initiation of a traffic session at the UE, a UAI communication that indicates parameters for the pattern of uplink resources or an uplink skipping indication that one or more proactive uplink grants are to be skipped by the UE. The operations of 1905 may be performed in accordance with examples as disclosed herein. In some examples, aspects of the operations of 1905 may be performed by an XR traffic manager 1325 as described with reference to FIG. 13.

At 1910, the method may include communicating with the UE to receive or transmit data associated with the traffic session based at least in part on the UAI or uplink skipping indication. The operations of 1910 may be performed in accordance with examples as disclosed herein. In some examples, aspects of the operations of 1910 may be performed by a scheduling manager 1330 as described with reference to FIG. 13.

Figure 20:
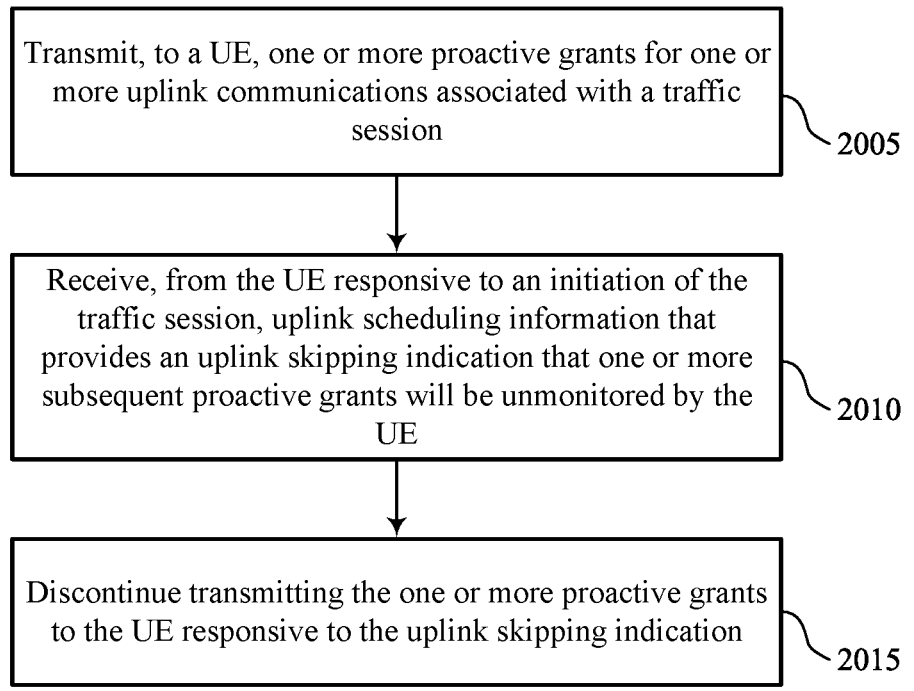

FIG. 20 shows a flowchart illustrating a method 2000 that supports UE indication of uplink scheduling parameters in wireless communications in accordance with aspects of the present disclosure. The operations of the method 2000 may be implemented by a base station or its components as described herein. For example, the operations of the method 2000 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2005, the method may include transmitting, to the UE, one or more proactive grants for one or more uplink communications associated with a traffic session. The operations of 2005 may be performed in accordance with examples as disclosed herein. In some examples, aspects of the operations of 2005 may be performed by a UL skipping manager 1335 as described with reference to FIG. 13.

At 2010, the method may include receiving, from the UE responsive to an initiation of the traffic session, uplink scheduling information that provides an uplink skipping indication that one or more subsequent proactive grants will be unmonitored by the UE. The operations of 2010 may be performed in accordance with examples as disclosed herein. In some examples, aspects of the operations of 2010 may be performed by an XR traffic manager 1325 as described with reference to FIG. 13.

At 2015, the method may include discontinuing transmitting the one or more proactive grants to the UE responsive to the uplink skipping indication. The operations of 2015 may be performed in accordance with examples as disclosed herein. In some examples, aspects of the operations of 2015 may be performed by a scheduling manager 1330 as described with reference to FIG. 13.

The following provides an overview of aspects of the present disclosure:

Aspect 1: A method for wireless communication at a UE, comprising: transmitting, responsive to an initiation of a traffic session at the UE, uplink scheduling information to a base station, the uplink scheduling information indicating one or more scheduling parameters associated with a pattern of uplink wireless resources for uplink data that is to be transmitted from the UE to the base station during the traffic session; and communicating with the base station to transmit or receive data associated with the traffic session based at least in part on the uplink scheduling information.

Aspect 2: The method of aspect 1, wherein the transmitting the uplink scheduling information comprises: transmitting, to the base station, one or more of a UE assistance information (UAI) communication that indicates parameters for the pattern of uplink resources or an uplink skipping indication that one or more proactive uplink grants are to be skipped by the UE.

Aspect 3: The method of aspect 2, wherein the UAI is associated with an extended reality session and includes one or more of a requested periodicity of uplink traffic, a requested offset of uplink traffic, a requested data size for uplink traffic for each time period associated with the extended reality session, a request to enable uplink transmission skipping, or any combinations thereof.

Aspect 4: The method of any of aspects 2 through 3, wherein the UAI includes one or more of a requested periodicity of uplink grants, a requested offset of uplink grants, a requested data size for each time period associated with the traffic session, a request to enable uplink transmission skipping, or any combinations thereof.

Aspect 5: The method of any of aspects 2 through 4, further comprising: receiving, from the base station, an uplink scheduling pattern that is based at least in part on the UAI.

Aspect 6: The method of aspect 5, further comprising: transitioning to a sleep mode between consecutive uplink grants based at least in part on the uplink scheduling pattern.

Aspect 7: The method of aspect 6, wherein the uplink scheduling pattern provides that uplink communications to the base station and downlink communications from the base station are coordinated to provide additional duration of the sleep mode relative to cases where UAI is unused in deriving the uplink scheduling pattern.

Aspect 8: The method of any of aspects 5 through 7, wherein at least a portion of the uplink scheduling pattern is received in RRC signaling.

Aspect 9: The method of aspect 8, wherein the uplink scheduling pattern provides one or more of a configured grant for the UE, an enablement of uplink transmission skipping, a sounding reference signal configuration, a channel state information report configuration, a DRX configuration, or any combinations thereof.

Aspect 10: The method of aspect 9, wherein the enablement of uplink transmission skipping indicates that the UE can skip an uplink shared channel communication when the UE does not have uplink data to transmit.

Aspect 11: The method of aspect 1, further comprising: receiving, from the base station, one or more proactive grants for one or more uplink communications; and wherein the uplink scheduling information provides an uplink skipping indication that one or more subsequent proactive grants will be unmonitored by the UE.

Aspect 12: The method of aspect 11, wherein the uplink skipping indication identifies that the one or more subsequent proactive grants will be unmonitored for a first time period or until a specific time.

Aspect 13: The method of aspect 12, wherein the first time period or the specific time correspond to a start of a subsequent downlink burst of the traffic session.

Aspect 14: The method of any of aspects 11 through 13, wherein the uplink skipping indication is an explicit indication provided in a scheduling request that is transmitted to the base station.

Aspect 15: The method of any of aspects 11 through 14, wherein the uplink skipping indication is provided in a medium access control (MAC) control element (CE) in which a buffer status report (BSR) indication is set to zero.

Aspect 16: The method of any of aspects 11 through 15, wherein the uplink skipping indication is provided by setting an inactivity timer of the UE to a value that initiates a DRX sleep state.

Aspect 17: The method of any of aspects 11 through 16, wherein the uplink skipping indication is provided as a layer-one request that is transmitted in uplink control information to the base station.

Aspect 18: A method for wireless communication at a base station, comprising: receiving, from a UE responsive to an initiation of a traffic session at the UE, uplink scheduling information that indicates one or more scheduling parameters associated with a pattern of uplink wireless resources for uplink data that is to be transmitted from the UE to the base station during the traffic session; and communicating with the UE to receive or transmit data associated with the traffic session based at least in part on the uplink scheduling information.

Aspect 19: The method of aspect 18, wherein the uplink scheduling information includes one or more of a UE assistance information (UAI) communication that indicates parameters for the pattern of uplink resources or an uplink skipping indication that one or more proactive uplink grants are to be skipped by the UE.

Aspect 20: The method of aspect 19, wherein the UAI is associated with an extended reality session and includes one or more of a requested periodicity of uplink traffic, a requested offset of uplink traffic, a requested data size for uplink traffic for each time period associated with the extended reality session, a request to enable uplink transmission skipping, or any combinations thereof.

Aspect 21: The method of any of aspects 19 through 20, wherein the UAI includes one or more of a requested periodicity of uplink grants, a requested offset of uplink grants, a requested data size for each time period associated with the extended reality session, a request to enable uplink transmission skipping, or any combinations thereof.

Aspect 22: The method of any of aspects 19 through 21, further comprising: transmitting, to the UE, an uplink scheduling pattern that is based at least in part on the UAI.

Aspect 23: The method of aspect 22, wherein the uplink scheduling pattern provides that uplink communications from the UE and downlink communications to the UE are coordinated to provide additional duration of a sleep mode at the UE relative to cases where UAI is unused in deriving the uplink scheduling pattern.

Aspect 24: The method of any of aspects 22 through 23, wherein at least a portion of the uplink scheduling pattern is transmitted to the UE in RRC signaling.

Aspect 25: The method of aspect 24, wherein the uplink scheduling pattern provides one or more of a configured grant for the UE, an enablement of uplink transmission skipping, a sounding reference signal configuration, a channel state information report configuration, a DRX configuration, or any combinations thereof.

Aspect 26: The method of aspect 25, wherein the enablement of uplink transmission skipping indicates that the UE can skip an uplink shared channel communication when the UE does not have uplink data to transmit.

Aspect 27: The method of aspect 18, further comprising: transmitting, to the UE, one or more proactive grants for one or more uplink communications associated with the traffic session, and wherein the uplink scheduling information provides an uplink skipping indication that one or more subsequent proactive grants will be unmonitored by the UE; and discontinuing transmitting the one or more proactive grants to the UE responsive to the uplink skipping indication.

Aspect 28: The method of aspect 27, wherein the uplink skipping indication identifies that the one or more subsequent proactive grants will be unmonitored for a first time period or until a specific time, and wherein the transmitting of the one or more proactive grants is discontinued for the first time period or until the specific time.

Aspect 29: The method of aspect 28, wherein the first time period or the specific time correspond to a start of a subsequent downlink burst of the traffic session.

Aspect 30: The method of any of aspects 27 through 29, wherein the uplink skipping indication is an explicit indication provided in a scheduling request that is received from the UE.

Aspect 31: The method of any of aspects 27 through 30, wherein the uplink skipping indication is provided in a medium access control (MAC) control element (CE) in which a buffer status report (BSR) indication is set to zero.

Aspect 32: The method of any of aspects 27 through 31, wherein the uplink skipping indication is provided by setting an inactivity timer of the UE to a value that initiates a DRX sleep state.

Aspect 33: The method of any of aspects 27 through 32, wherein the uplink skipping indication is provided as a layer-one request that is transmitted in uplink control information from the UE.

Aspect 34: An apparatus for wireless communication at a UE, comprising at least one processor; memory coupled with the at least one processor; and instructions stored in the memory and executable by the at least one processor to cause the apparatus to perform a method of any of aspects 1 through 17.

Aspect 35: An apparatus for wireless communication at a UE, comprising at least one means for performing a method of any of aspects 1 through 17.

Aspect 36: A non-transitory computer-readable medium storing code for wireless communication at a UE, the code comprising instructions executable by at least one processor to perform a method of any of aspects 1 through 17.

Aspect 37: An apparatus for wireless communication at a base station, comprising at least one processor; memory coupled with the at least one processor; and instructions stored in the memory and executable by the at least one processor to cause the apparatus to perform a method of any of aspects 18 through 33.

Aspect 38: An apparatus for wireless communication at a base station, comprising at least one means for performing a method of any of aspects 18 through 33.

Aspect 39: A non-transitory computer-readable medium storing code for wireless communication at a base station, the code comprising instructions executable by at least one processor to perform a method of any of aspects 18 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    transmitting, responsive to an initiation of a traffic session at the UE, uplink scheduling information to a network device, the traffic session comprising an extended reality session and the uplink scheduling information comprising UE assistance information associated with the extended reality session, the UE assistance information comprising one or more scheduling parameters that indicate a traffic pattern for the traffic session, the traffic pattern associated with uplink wireless resources for uplink data that is to be transmitted from the UE to the network device during the traffic session; and
    communicating with the network device to transmit or receive data associated with the traffic session based at least in part on the UE assistance information.

2. The method of claim 1, wherein the transmitting the uplink scheduling information comprises:
    transmitting, to the network device, an uplink skipping indication that one or more proactive uplink grants are to be skipped by the UE.

3. The method of claim 1, wherein the UE assistance information includes one or more of a requested periodicity of uplink traffic, a requested offset of the uplink traffic, a requested data size for the uplink traffic for each time period associated with the extended reality session, a request to enable uplink transmission skipping, or any combinations thereof.

4. The method of claim 3, wherein the UE assistance information further includes one or more of a second requested periodicity of uplink grants, a second requested offset of the uplink grants, a second requested data size for each time period associated with the extended reality session, a second request to enable the uplink transmission skipping, or any combinations thereof.

5. The method of claim 1, further comprising:
receiving, from the network device, an uplink scheduling pattern that is based at least in part on the UE assistance information.

6. The method of claim 5, further comprising:
transitioning to a sleep mode between consecutive uplink grants based at least in part on the uplink scheduling pattern.

7. The method of claim 6, wherein the uplink scheduling pattern provides that uplink communications to the network device and downlink communications from the network device are coordinated to provide an additional duration of the sleep mode relative to cases where other UE assistance information is unused in deriving the uplink scheduling pattern.

8. The method of claim 5, wherein at least a portion of the uplink scheduling pattern is received via radio resource control (RRC) signaling.

9. The method of claim 8, wherein the uplink scheduling pattern provides one or more of a configured grant for the UE, an enablement of uplink transmission skipping, a sounding reference signal configuration, a channel state information report configuration, a discontinuous reception (DRX) configuration, or any combinations thereof.

10. The method of claim 9, wherein the enablement of the uplink transmission skipping indicates that the UE can skip an uplink shared channel communication when the UE does not have uplink data to transmit.

11. The method of claim 1, further comprising:
receiving, from the network device, one or more proactive grants for one or more uplink communications,
wherein the uplink scheduling information provides an uplink skipping indication that one or more subsequent proactive grants will be unmonitored by the UE.

12. The method of claim 11, wherein the uplink skipping indication identifies that the one or more subsequent proactive grants will be unmonitored for a first time period or until a specific time.

13. The method of claim 12, wherein the first time period or the specific time correspond to a start of a subsequent downlink burst of the traffic session.

14. The method of claim 11, wherein the uplink skipping indication is an explicit indication provided via a scheduling request that is transmitted to the network device.

15. The method of claim 11, wherein the uplink skipping indication is provided via a medium access control (MAC) control element (CE) in which a buffer status report (BSR) indication is set to zero.

16. The method of claim 11, wherein the uplink skipping indication is provided by setting an inactivity timer of the UE to a value that initiates a discontinuous reception (DRX) sleep state.

17. The method of claim 11, wherein the uplink skipping indication is provided as a layer-one request that is transmitted via uplink control information to the network device.

18. A method for wireless communication at a network device, comprising:

receiving, from a user equipment (UE) responsive to an initiation of a traffic session at the UE, uplink scheduling information, the traffic session comprising an extended reality session and the uplink scheduling information comprising UE assistance information associated with the extended reality session, the UE assistance information comprising one or more scheduling parameters that indicate a traffic pattern for the traffic session, the traffic pattern associated with uplink wireless resources for uplink data that is to be transmitted from the UE to the network device during the traffic session; and
communicating with the UE to receive or transmit data associated with the traffic session based at least in part on the UE assistance information.

19. The method of claim 18, wherein the uplink scheduling information further includes an uplink skipping indication that one or more proactive uplink grants are to be skipped by the UE.

20. The method of claim 18, wherein the UE assistance information includes one or more of a requested periodicity of uplink traffic, a requested offset of the uplink traffic, a requested data size for the uplink traffic for each time period associated with the extended reality session, a request to enable uplink transmission skipping, or any combinations thereof.

21. The method of claim 20, wherein the UE assistance information further includes one or more of a second requested periodicity of uplink grants, a second requested offset of the uplink grants, a second requested data size for each time period associated with the extended reality session, a second request to enable the uplink transmission skipping, or any combinations thereof.

22. The method of claim 18, further comprising:
transmitting, to the UE, an uplink scheduling pattern that is based at least in part on the UE assistance information.

23. The method of claim 18, further comprising:
transmitting, to the UE, one or more proactive grants for one or more uplink communications associated with the traffic session, wherein the uplink scheduling information provides an uplink skipping indication that one or more subsequent proactive grants will be unmonitored by the UE; and
discontinuing transmitting the one or more proactive grants to the UE responsive to the uplink skipping indication.

24. A user equipment (UE), comprising:
one or more memories storing processor-executable code; and
one or more processors coupled with the one or more memories and individually or collectively operable to execute the code to cause the UE to:
transmit, responsive to an initiation of a traffic session at the UE, uplink scheduling information to a network device, the traffic session comprising an extended reality session and the uplink scheduling information comprising UE assistance information associated with the extended reality session, the UE assistance information comprising one or more scheduling parameters that indicate a traffic pattern for the traffic session, the traffic pattern associated with uplink wireless resources for uplink data that is to be transmitted from the UE to the network device during the traffic session; and communicate with the network device to transmit or receive data associated with the traffic session based at least in part on the UE assistance information.

25. The UE of claim 24, wherein, to transmit the uplink scheduling information, the one or more processors are individually or collectively operable to execute the code to cause the UE to:
transmit, to the network device, an uplink skipping indication that one or more proactive uplink grants are to be skipped by the UE.

26. The UE of claim 24, wherein the UE assistance information includes one or more of a requested periodicity of uplink traffic, a requested offset of the uplink traffic, a requested data size for the uplink traffic for each time period associated with the extended reality session, a request to enable uplink transmission skipping, or any combinations thereof.

27. The UE of claim 24, wherein the one or more processors are individually or collectively further operable to execute the code to cause the UE to:
receive, from the network device, one or more proactive grants for one or more uplink communications,
wherein the uplink scheduling information provides an uplink skipping indication that one or more subsequent proactive grants will be unmonitored by the UE.

28. A network device, comprising:
one or more memories storing processor-executable code; and
one or more processors coupled with the one or more memories and individually or collectively operable to execute the code to cause the network device to:
receive, from a user equipment (UE) responsive to an initiation of a traffic session at the UE, uplink scheduling information, the traffic session comprising an extended reality session and the uplink scheduling information comprising UE assistance information associated with the extended reality session, the UE assistance information comprising one or more scheduling parameters that indicate a traffic pattern for the traffic session, the traffic pattern associated with uplink wireless resources for uplink data that is to be transmitted from the UE to the network device during the traffic session; and
communicate with the UE to receive or transmit data associated with the traffic session based at least in part on the UE assistance information.

29. The network device of claim 28, wherein the uplink scheduling information further includes an uplink skipping indication that one or more proactive uplink grants are to be skipped by the UE.

30. The network device of claim 28, wherein the UE assistance information includes one or more of a requested periodicity of uplink traffic, a requested offset of the uplink traffic, a requested data size for the uplink traffic for each time period associated with the extended reality session, a request to enable uplink transmission skipping, or any combinations thereof.

* * * * *